(12) United States Patent  
Sum et al.

(10) Patent No.: US 10,126,637 B2  
(45) Date of Patent: *Nov. 13, 2018

(54) PROJECTION DEVICE FOR PROJECTING IMAGES ON A SURFACE OF THE DEVICE

(71) Applicant: Kan Wah Kan Sum, Hong Kong (HK)

(72) Inventors: Kan Wah Kan Sum, Hong Kong (HK); Chun Yuen Lau, Hong Kong (HK)

(73) Assignee: Kan Wah Kan Sum, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,706

(22) Filed: Apr. 3, 2018

(65) Prior Publication Data

US 2018/0224729 A1    Aug. 9, 2018

Related U.S. Application Data

(63) Continuation of application No. 15/648,434, filed on Jul. 12, 2017, now Pat. No. 9,946,141, which is a (Continued)

(51) Int. Cl.
| | |
|---|---|
| *G03B 21/14* | (2006.01) |
| *G03B 21/10* | (2006.01) |
| *G03B 31/00* | (2006.01) |
| *G03B 21/20* | (2006.01) |
| *G03B 23/10* | (2006.01) |

(Continued)

(52) U.S. Cl.
CPC ............ *G03B 21/10* (2013.01); *A41G 1/003* (2013.01); *A41G 1/005* (2013.01); *A41G 1/008* (2013.01); *A63H 3/006* (2013.01); *A63H 3/365* (2013.01); *A63H 33/22* (2013.01); *G03B 21/001* (2013.01); *G03B 21/2033* (2013.01); *G03B 21/325* (2013.01); *G03B 23/105* (2013.01); *G03B 31/00* (2013.01)

(58) Field of Classification Search
CPC ........ G03B 21/14; G03B 31/00; G03B 21/32; G03B 21/321; G03B 21/325; F21S 6/00; F21V 33/00; F21V 33/0052; G09B 5/067
See application file for complete search history.

(56) References Cited

U.S. PATENT DOCUMENTS

2002/0135742 A1* 9/2002 Chiang ................. G03B 21/20  
    353/109  
2015/0070595 A1* 3/2015 Chien ....................... F21S 9/02  
    349/5

(Continued)

*Primary Examiner* — William C Dowling

(57) ABSTRACT

A projection device for projecting images on a surface of the device includes an outer housing having a front translucent screen, a projection module frame mounted on an inner surface of the outer housing, and a projection roller frame supported by the projection module frame. The projection roller frame includes first and second spaced apart rollers rotatable respectively on two opposite cylindrical ends integrally formed on a lampshade. A cylindrical projection film is held between the first and second rollers. A light source is mounted inside the lampshade so that an image formed on the projection film can be projected on the front translucent screen by the light source. The device further includes a gear mechanism for driving the rollers, a position-limiting mechanism, and a speaker.

20 Claims, 24 Drawing Sheets

Related U.S. Application Data continuation-in-part of application No. 14/745,500, filed on Jun. 22, 2015, now Pat. No. 9,750,294.

(60) Provisional application No. 62/060,559, filed on Oct. 6, 2014.

(51) Int. Cl.
*A41G 1/00* (2006.01)
*G03B 21/00* (2006.01)
*G03B 21/32* (2006.01)
*A63H 33/22* (2006.01)
*A63H 3/00* (2006.01)
*A63H 3/36* (2006.01)

(56) References Cited

U.S. PATENT DOCUMENTS

| | | | | |
|---|---|---|---|---|
| 2015/0070938 A1* | 3/2015 | Chien | ............ | F21S 9/02 362/644 |
| 2016/0097499 A1* | 4/2016 | Chien | ............ | F21S 9/02 362/644 |
| 2016/0313636 A1* | 10/2016 | Chien | ............ | G03B 29/00 |

* cited by examiner

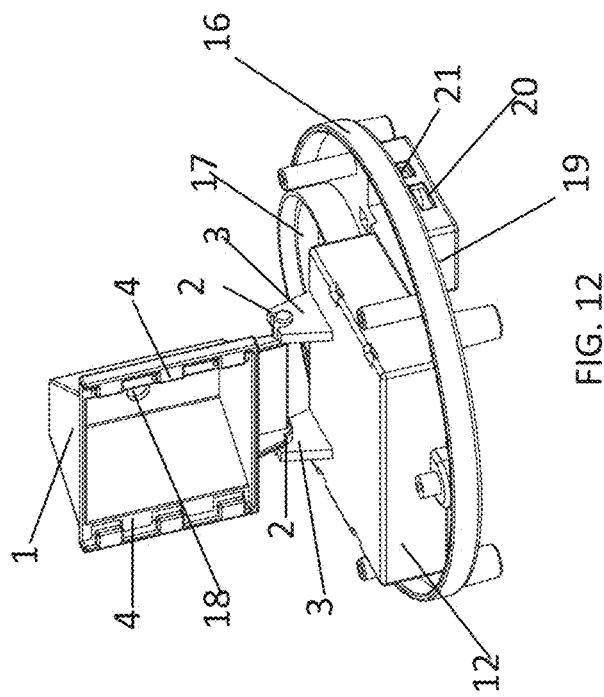
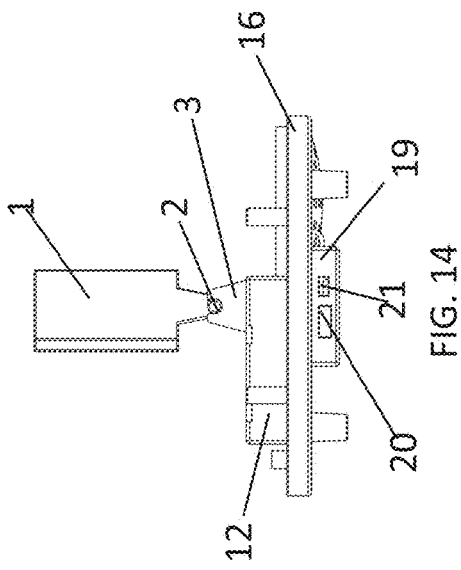
FIG. 12
FIG. 14
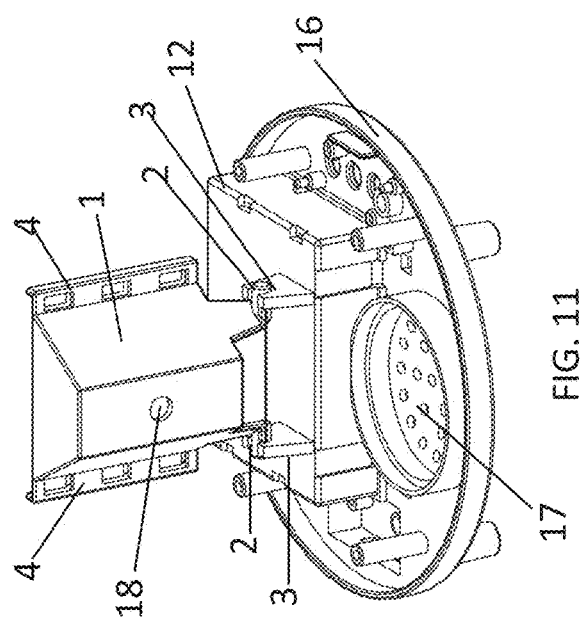
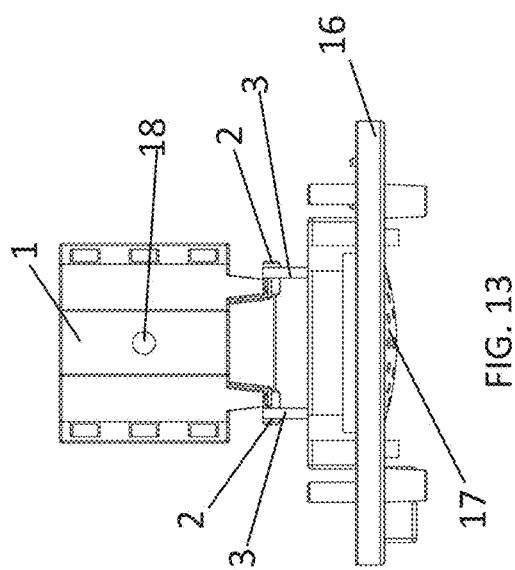
FIG. 11
FIG. 13

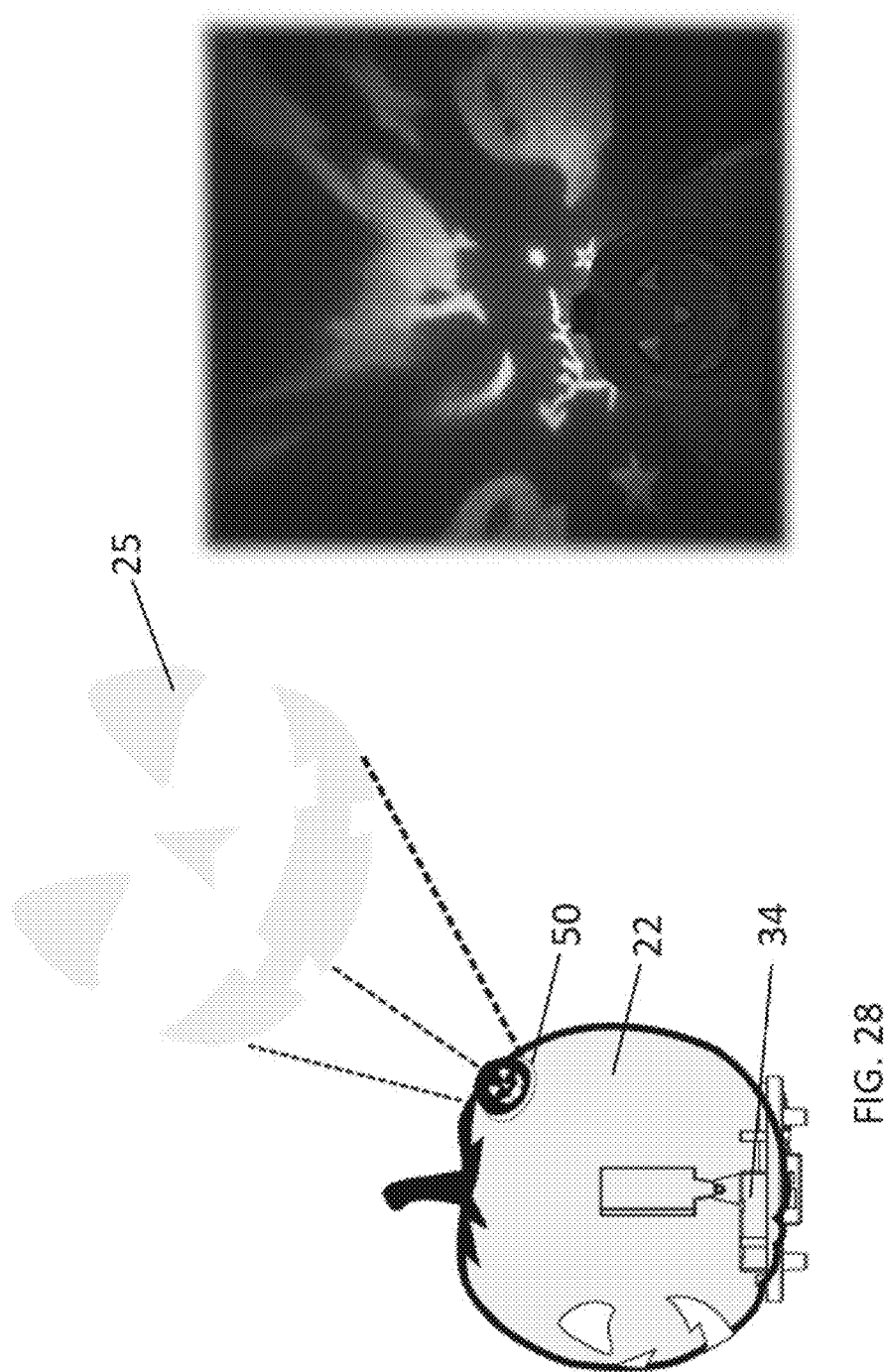

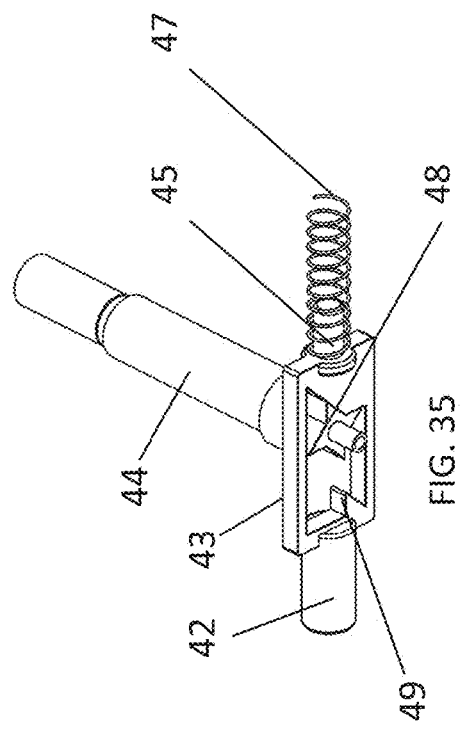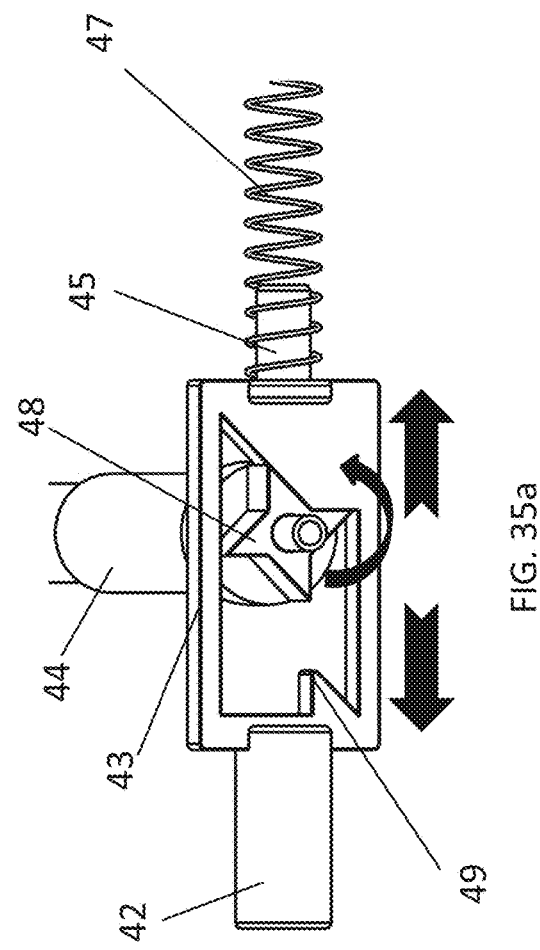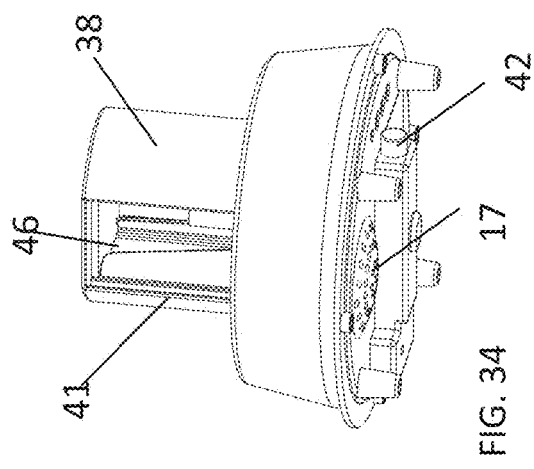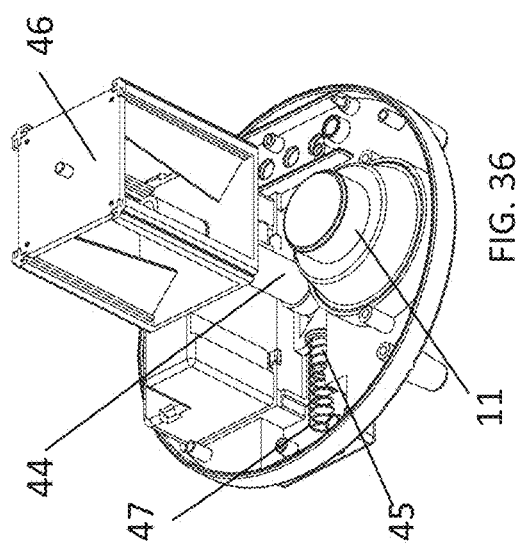

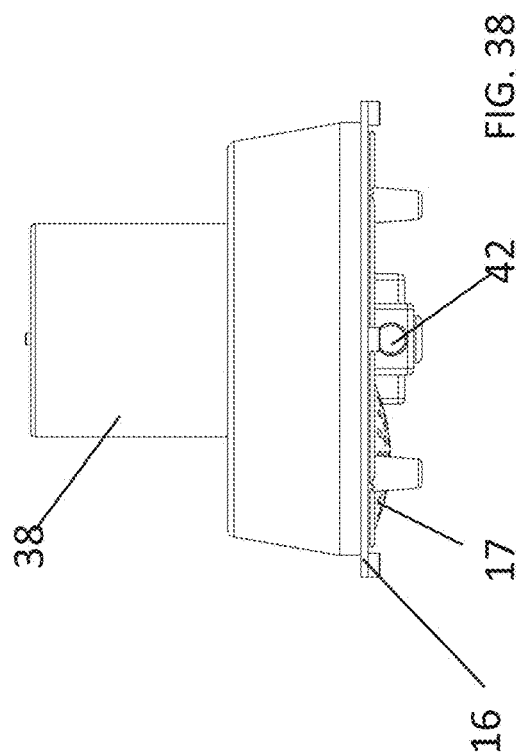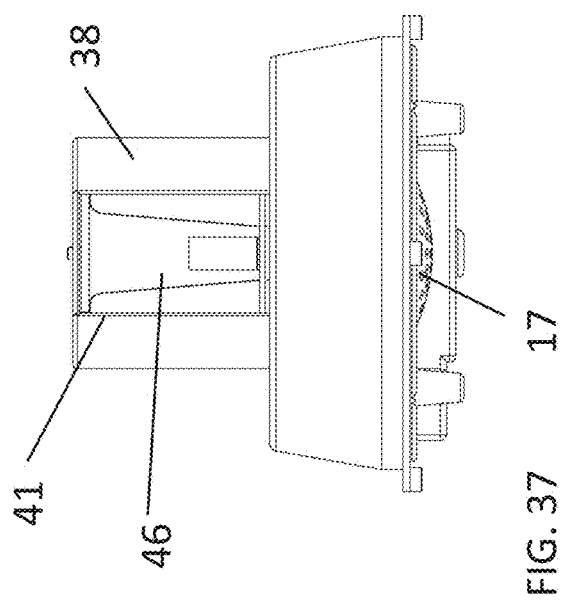

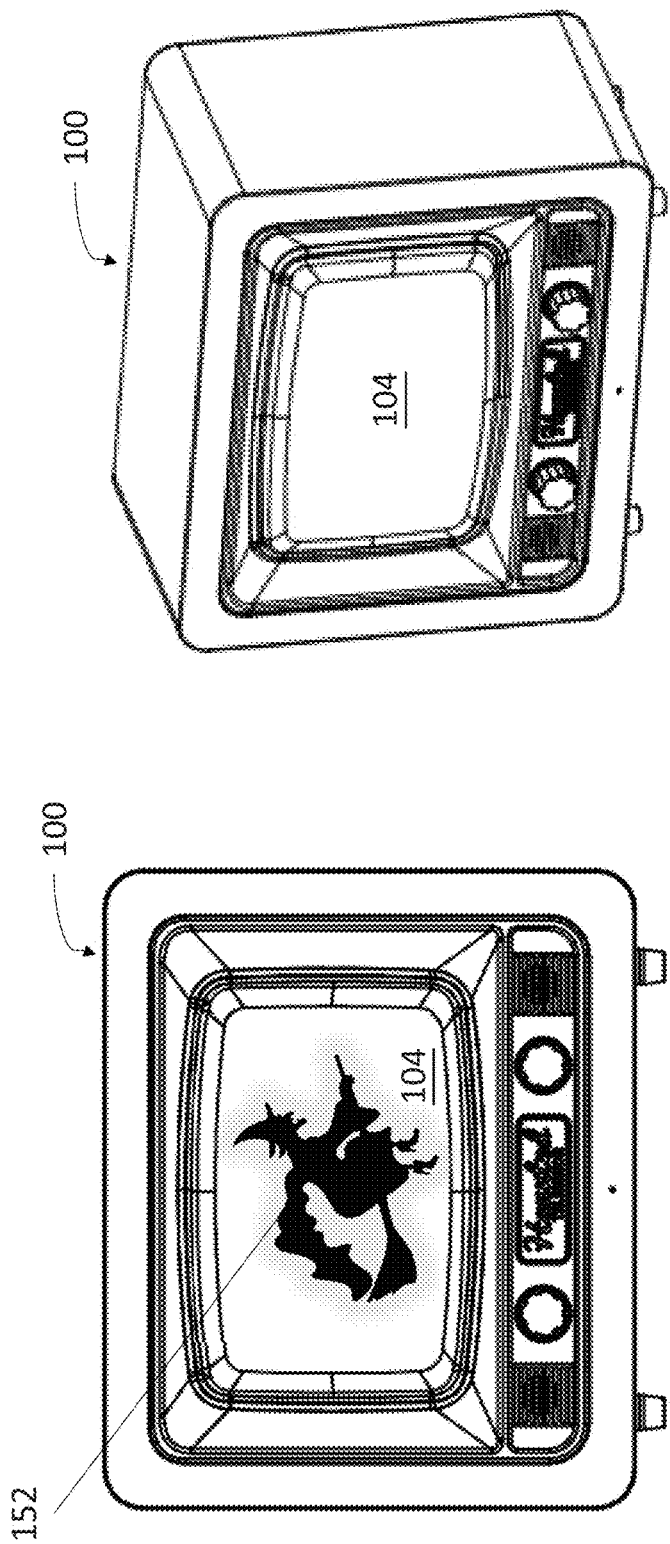

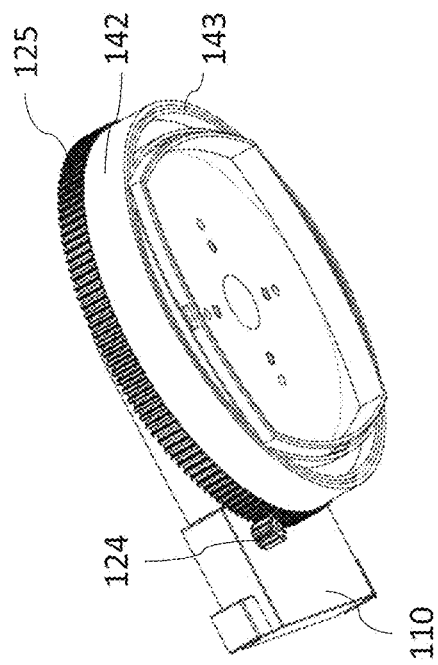
FIG. 57
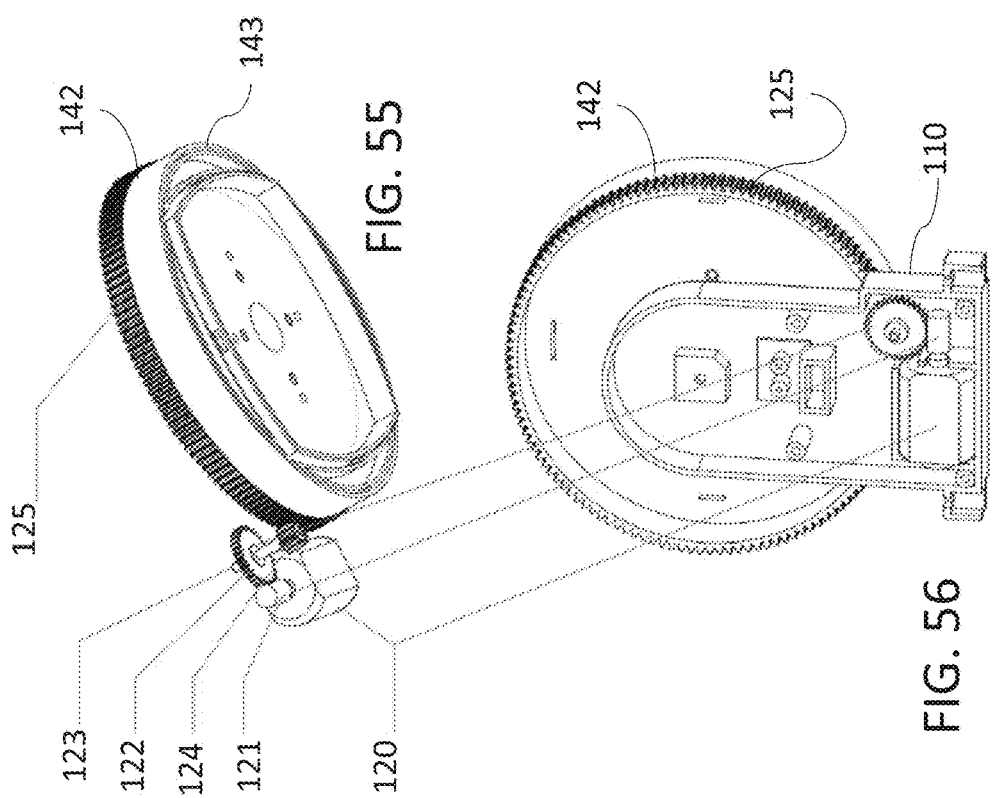
FIG. 55
FIG. 56

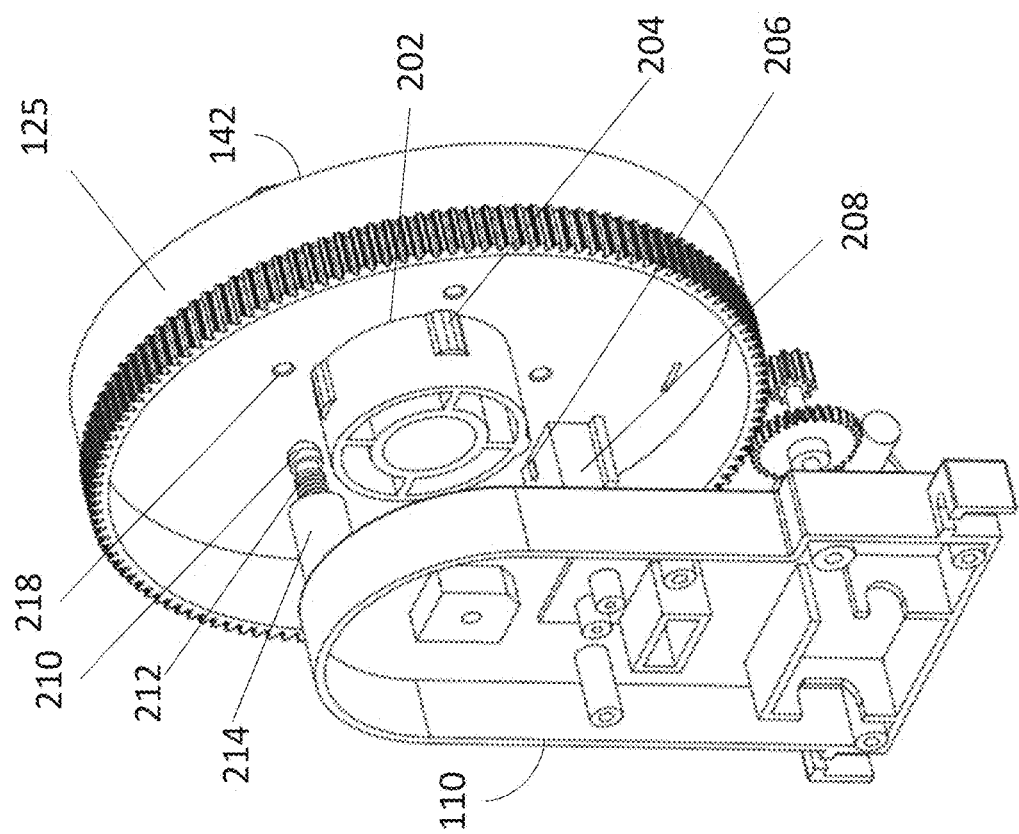

PROJECTION DEVICE FOR PROJECTING IMAGES ON A SURFACE OF THE DEVICE

CROSS-REFERENCE TO RELATED APPLICATIONS

This application is a Continuation application of U.S. Non-provisional patent application Ser. No. 15/648,434 filed on Jul. 12, 2017, which is a Continuation-in-part application of U.S. Non-provisional patent application Ser. No. 14/745,500 filed on Jun. 22, 2015, which claims the benefit of U.S. Provisional Patent Application No. 62/060,559 filed on Oct. 6, 2014, the entire contents of which are hereby incorporated by reference.

FIELD OF THE TECHNOLOGY

The present patent application generally relates to a projection device, and particularly to a projection device for projecting images on a surface of the device.

BACKGROUND

There are illuminated novelties for parties, holidays and festivals such as Halloween, Christmas, and Easter. For example, there are illuminated novelties such as Halloween Jack-'O-Lanterns that may be made and used as decoration. Traditionally, a lot of people like to decorate their porches or their houses with pumpkin decorations for Halloween. Pumpkin carving is a popular event for kids, by removing the soft pulp of a pumpkin, carving side openings representing eyes, nose and mouth of the pumpkin and placing a candle inside the hollow pumpkin to light up the carved openings and the pumpkin head, which is commonly called Jack-'O-Lantern. However, real pumpkin decorations are perishable and can't be displayed for a long time. Therefore, artificial Jack-'O-Lanterns have been developed which are made of different materials, such as ceramic, Polyresin, PU foam, Paper Mache, Styrofoam or plastic materials. Some of these artificial pumpkins are known to have electric lights or battery-operated light bulbs to replace candles as a light source inside the pumpkin. Both real pumpkin and artificial pumpkins are limited to one carved face or one molded face only. Since the face is either carved or molded on the pumpkin, so the face cannot be changed unless you buy a new one or carve another real pumpkin. Some of the decoration pumpkins may come with sound and light, but the sound is pre-recorded in IC chip which is usually very short and the sound quality is not very good, and people do not have a choice on the music or sound playback from the pumpkin decoration.

There is a desire to produce a projection device which can project various images on the surface of the device.

The above description of the background is provided to aid in understanding the projection device, but is not admitted to describe or constitute pertinent prior art to the projection device, or consider the cited documents as material to the patentability of the claims of the present application.

SUMMARY

According to one aspect, there is a projection device for projecting images on a surface of the device, including:
an outer housing comprising a front translucent screen;
a projection module frame mounted on an inner surface of a rear panel of the outer housing, wherein the projection module frame comprises a first projection module frame member, and a second projection module frame member spaced apart from the first projection module frame member, wherein the first projection module frame member is in the form of an inner casing;
a projection roller frame supported by the projection module frame, wherein the projection roller frame comprises first and second spaced apart rollers rotatable respectively on two opposite cylindrical ends integrally formed on a lampshade, one of the two opposite cylindrical ends being coupled with the first projection module frame member, and another one of the two opposite cylindrical ends being coupled with the second projection module frame member;
a cylindrical projection film mounted between the first and second rollers;
a gear mechanism accommodated inside the inner casing for rotating the first and second rollers and in turn the cylindrical projection film;
a motor accommodated inside the inner casing for driving the gear mechanism;
an LED light source mounted inside the lampshade so that an image formed on the projection film can be projected on the front translucent screen by the light source;
a cylindrical member formed at a center of a surface of the first roller facing the first projection module frame member;
a plurality of switch actuators formed around an outer circumference of the cylindrical member;
a switch provided on a switch box formed on a surface of the first projection module frame member facing the first roller, the switch being connected with an integrated circuit, and actuatable by the switch actuators;
a pin having an enlarged head, the pin being slidably received in a sleeve formed on the surface of the first projection module frame member;
a spring mounted around the pin for biasing the enlarged head of the pin against the surface of the first roller; and
a plurality of recesses formed on the surface of the first roller around the cylindrical member, the recesses being engageable with the enlarged head of the pin;
wherein when the motor is started, the first roller rotates via the gear mechanism until the switch is actuated by one of the switch actuators, and when the switch is actuated, the motor is switched off, and wherein the enlarged head of the pin is caught and held by one of the recesses, thereby holding the projection film in a position where the image is projectable on the front translucent screen.

According to another aspect, there is provided a projection device for projecting images on a surface of the device, including:
an outer housing comprising a front translucent screen;
a projection module frame mounted on an inner surface of the outer housing;
a projection roller frame supported by the projection module frame, wherein the projection roller frame comprises first and second spaced apart rollers rotatable respectively on two opposite cylindrical ends integrally formed on a lampshade;
a projection film being curled up and held between the first and second rollers;
a light source mounted inside the lampshade so that an image formed on the projection film can be projected on the front translucent screen by the light source;
a gear mechanism coupled with the first roller; and
a motor coupled with the gear mechanism.

The projection device may further include:
a cylindrical member formed at a center of a surface of the first roller facing the projection module frame;
a plurality of switch actuators formed around an outer circumference of the cylindrical member;
a switch provided on a switch box formed on a surface of the projection module frame facing the first roller, the switch being connected with an integrated circuit, and actuatable by the switch actuators;
a pin having an enlarged head, the pin being slidably received in a sleeve formed on the surface of the projection module frame;
a spring mounted around the pin for biasing the enlarged head of the pin against the surface of the first roller; and
a plurality of recesses formed on the surface of the first roller around the cylindrical member, the recesses being engageable with the enlarged head of the pin;
wherein when the motor is started, the first roller rotates via the gear mechanism until the switch is actuated by one of the switch actuators, and when the switch is actuated, the motor is switched off, and wherein the enlarged head of the pin is caught and held by one of the recesses, thereby holding the projection film in a position where the image is projectable on the front translucent screen.

In one embodiment, the projection module frame may include a first projection module frame member, and a second projection module frame member spaced apart from the first projection module frame member, wherein the first projection module frame member is in the form of an inner casing.

In one embodiment, one of the two opposite cylindrical ends of the lampshade is coupled with the first projection module frame member, and another one of the two opposite cylindrical ends of the lampshade is coupled with the second projection module frame member.

In one embodiment, the motor and the gear mechanism are accommodated inside the inner casing.

In one embodiment, the gear mechanism includes a worm rod mounted on a motor shaft of the motor; a first gear fixed on a gear shaft and engaged with the worm rod; a second gear fixed on the gear shaft and engaged with an external ring gear provided on an outer circumference of the first roller.

In one embodiment, the projection film has a first end held in a first groove formed on an inner surface of the first roller, and a second end held in a second groove formed on an inner surface of the second roller facing the inner surface of the first roller.

In one embodiment, the projection film is cylindrical in shape.

In one embodiment, the lampshade is sized and shaped to direct light from the light source towards the front translucent screen.

In one embodiment, the light source is an LED light source.

In one embodiment, the outer housing is in the shape of a cubic television set, and comprises a face panel provided at a front side of the outer housing; and a pressing frame press-fitting the front translucent screen on the face panel.

In one embodiment, a switching knob is provided on the face panel for activating the device or switching power on or off.

In one embodiment, a speaker is provided inside the outer housing, and a volume control knob is provided on the face panel for adjusting volume of the speaker. The speaker is a Bluetooth® speaker and Bluetooth® technology is used for communication between the speaker and a mobile device so that the speaker can play music and sound from the mobile device.

In one embodiment, the projection film has four images, and the image on the projection film is selected from the group consisting of transparent image, non-transparent image, cut-out hole and silhouette.

In one embodiment, a battery is held in a battery compartment which is formed on a rear panel of the outer housing to supply electricity to the projection device, and the first and second rollers are disc-shaped rollers.

Although the projection device is shown and described with respect to certain embodiments, it is obvious that equivalents and modifications will occur to others skilled in the art upon the reading and understanding of the specification. The projection device in the present application includes all such equivalents and modifications, and is limited only by the scope of the claims.

BRIEF DESCRIPTION OF THE DRAWINGS

Specific embodiments of the projection device will now be described by way of example with reference to the accompanying drawings wherein:

FIG. 11 is the perspective view of the module according to an embodiment of the present application.

FIG. 12 is another perspective view of the module according to an embodiment of the present application.

FIG. 13 is the back view of the module according to an embodiment of the present application.

FIG. 14 is the side view of the module according to an embodiment of the present application.

FIG. 28 is the drawing of the illuminated pumpkin with projection unit place on the surface of the pumpkin shell, illustrating the projected image can be projected on to the wall according to the fifth embodiment of the present application.

FIG. 34 is the perspective view of the cylinder-shaped projection unit with rotatable projection film holder according to the fourth embodiment of the present application.

FIG. 35 is the drawing of the button and the shaft according to an embodiment of the present application.

FIG. 35a is an enlarged drawing of the button and the shaft according to an embodiment of the present application.

FIG. 36 is another perspective view of the cylinder-shaped projection unit with rotatable projection film holder according to the fourth embodiment of the present application.

FIG. 37 is a side view of the cylinder-shaped projection module according to the fourth embodiment of the present application.

FIG. 38 is another side view of the cylinder-shaped projection module according to the fourth embodiment of the present application.

FIG. 42 is a front view of a projection device for projecting images on a surface of the device according to an embodiment of the present application.

FIG. 43 is a perspective view of the projection device of the present application.

FIGS. 55-57 are perspective views of a gear mechanism of the projection device according to an embodiment of the present application.

FIG. 60 is a perspective view of a position-limiting mechanism of the projection device according to an embodiment of the present application.

DETAILED DESCRIPTION

Figure 1:
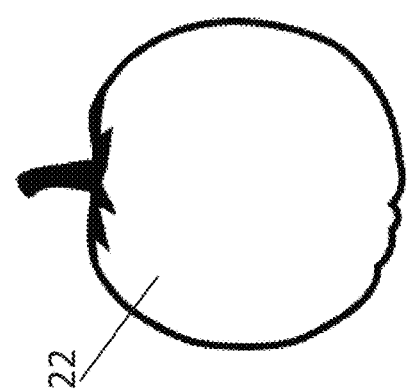
FIG. 1 is a pumpkin-shaped device with a projection image on it according to an embodiment of the present application.

Reference will now be made in detail to a preferred embodiment of the projection device, examples of which are also provided in the following description. Exemplary embodiments of the projection device are described in detail, although it will be apparent to those skilled in the relevant art that some features that are not particularly important to an understanding of the projection device may not be shown for the sake of clarity.

Furthermore, it should be understood that the projection device not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the protection.

For illustration purposes, the terms "upper", "lower", "right", "left", "vertical", "horizontal", "top", "bottom" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention. Hence, specific dimensions and other physical characteristics related to the embodiments disclosed hereinafter are not to be considered as limiting.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

In accordance with an embodiment of the present patent application, FIGS. 1-6 provide different views of the illuminated pumpkin decoration with different configurations of the projection device. As shown in these figures, the illuminated pumpkin may include the following parts: a pumpkin shaped shell 22, a module 34 and a projection unit 1, or a dome-shaped projection unit 27, or a rotatable cylinder-shaped projection unit 38. It is understood that the projection unit may in any other shape.

The pumpkin shell 22 may be made of plastic, vinyl or other rigid materials. The pumpkin shell 22 should be shaped like a real pumpkin. There is an opening at the bottom of the pumpkin shell 22 for installation of the module 34.

The pumpkin shell 22 may also include recessed depressions or cut out holes representing the face of a Jack-'O-Lantern pumpkin. If recessed depressions are applied on the pumpkin shell 22, fabric or paint may be attached or painted on the recessed area to represent eyes, nose and mouth of a Jack-'O-Lantern. The painted or fabric covered area will cover the light when lights inside the pumpkin shell 22 are on and then generate a silhouette or an image of a Jack-O-Lantern face. When cut out holes are applied to the pumpkin shell, the cut out area allows light to shine through the holes. When lights inside the pumpkin shell 22 are on, then it generates an illuminated Jack-'O-Lantern face as the interior light source is shining through the holes.

Both recessed depressions and cut out holes create a permanent face on the pumpkin shell 22, but that face cannot be hidden, removed or changed.

Figure 2:
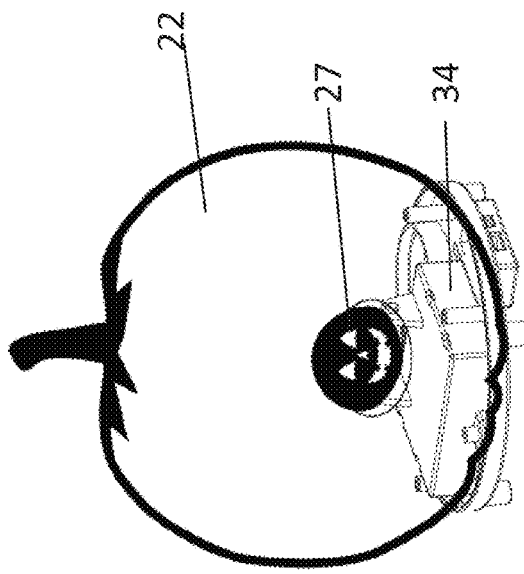
FIG. 2 is the pumpkin without any projection image on it.

The present patent application provides several embodiments of a pumpkin shell 22 with hidden face or image inside. The pumpkin shell 22 can be made to look just like an ordinary pumpkin decoration. No one would know what's inside until the lights inside the pumpkin shell 22 are turned on. LED fixed on the projection unit 1 may work as a light source to project a projected image 23 onto the pumpkin shell 22 from its interior. The image on projection film can be projected onto the pumpkin shell 22 and can generate an illuminated face or an illuminated image, which can be visible from outside the pumpkin shell 22. FIG. 1 shows the projected image 23 on the pumpkin shell 22 and FIG. 2 shows the pumpkin shell 22 without any projected image.

In addition to the pumpkin shell 22, the present patent application also includes a module 34 which may be attached to the opening at the bottom of the pumpkin shell 22, as shown in FIGS. 3-6 and FIG. 28. The module 34 includes two main sections, namely a projection section and a power controller section.

The projection section can be configured in five different options/embodiments:

Embodiment 1

Figure 4:
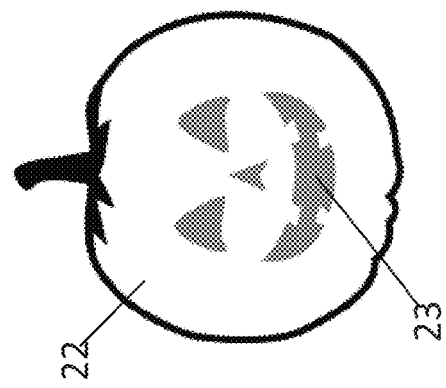
FIG. 4 is the perspective view of the pumpkin-shaped device with changeable projection unit in it according to the first embodiment of the present application.
Figure 5:
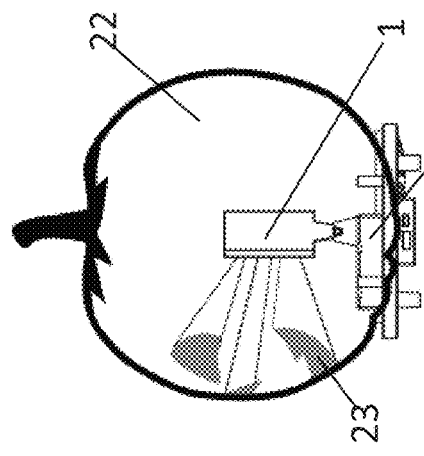
FIG. 5 is the perspective view of the pumpkin-shaped device with changeable projection unit in it, illustrating the projection image is projected from the projection unit onto the pumpkin shell from its interior according to the first embodiment of the present application.

The projection section can be configured as a projection unit 1 to hold a rectangle projection film 26 (see FIGS. 4-5).

Figure 7:
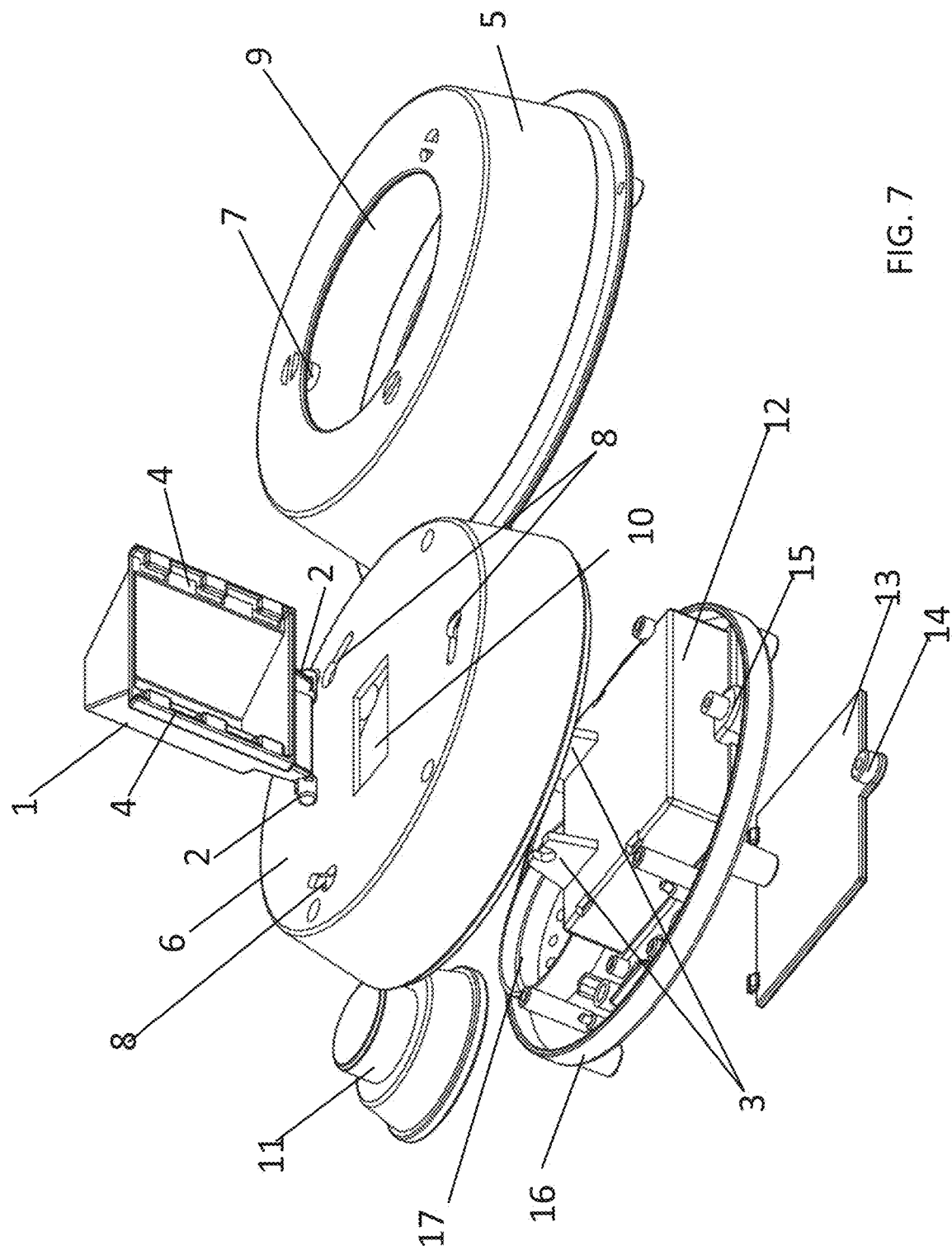
FIG. 7 is a comprehensive drawing of the module inside the pumpkin-shaped device with changeable projection images with the pumpkin shell being removed according to the first embodiment of the present application.
Figure 8:
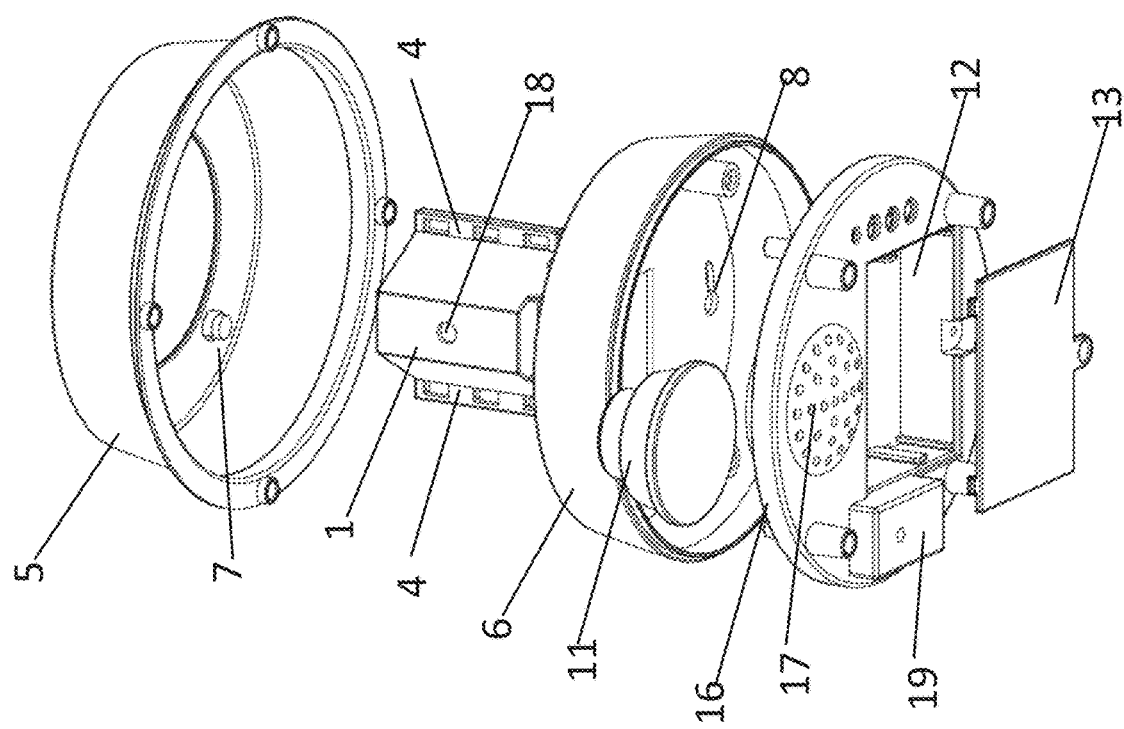
FIG. 8 is another comprehensive drawing of the module inside the pumpkin-shaped device with changeable projection images according to an embodiment of the present application.
Figure 10:
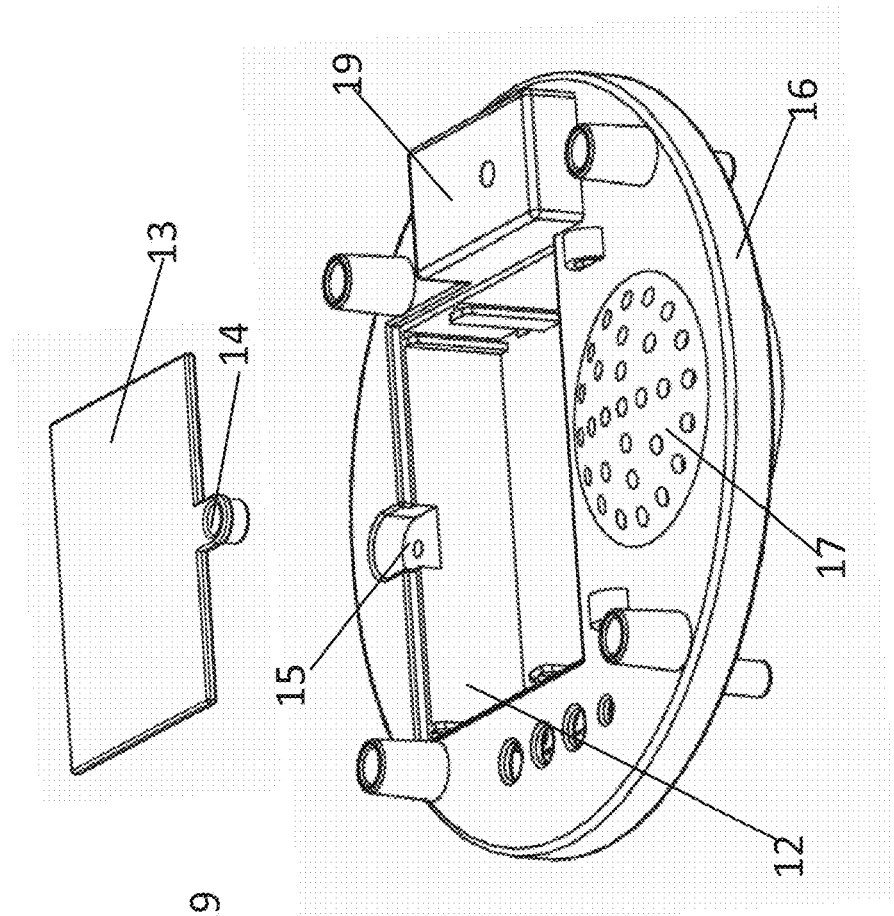
FIG. 10 is the perspective view of the base of the module according to an embodiment of the present application.
Figure 9:
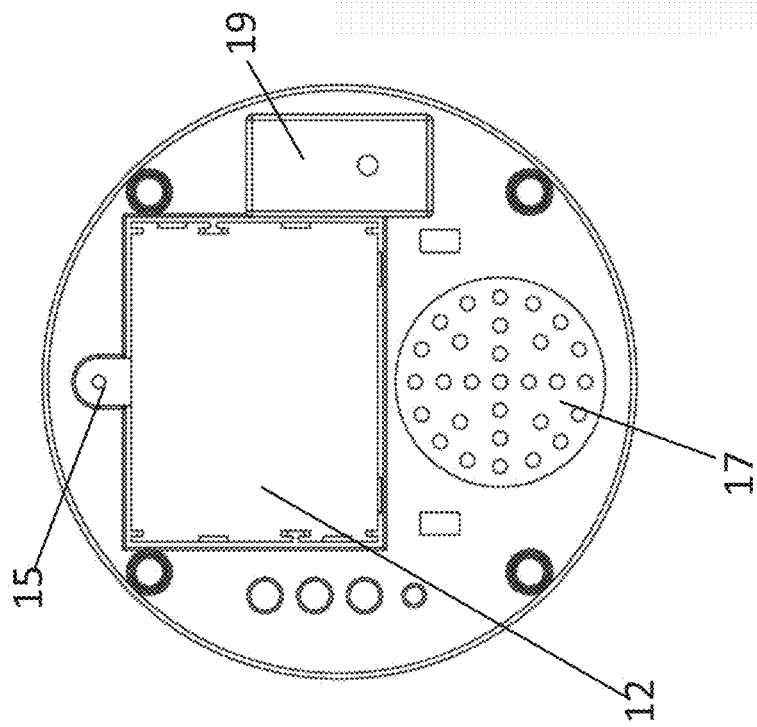
FIG. 9 is the bottom view of the module according to an embodiment of the present application.
Figure 16:
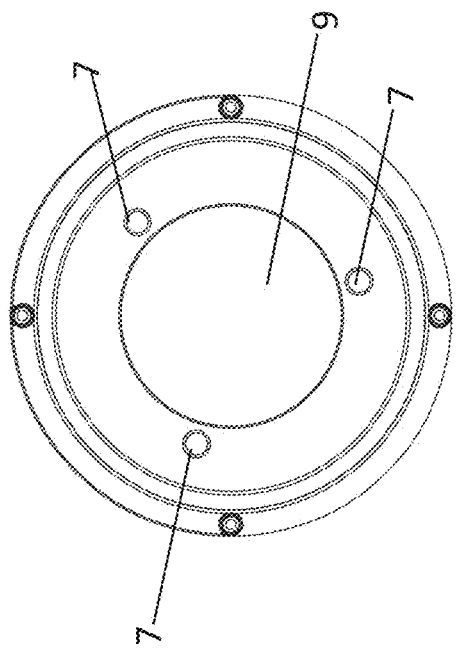
FIG. 16 is the bottom view of the outer housing according to an embodiment of the present application.
Figure 18:
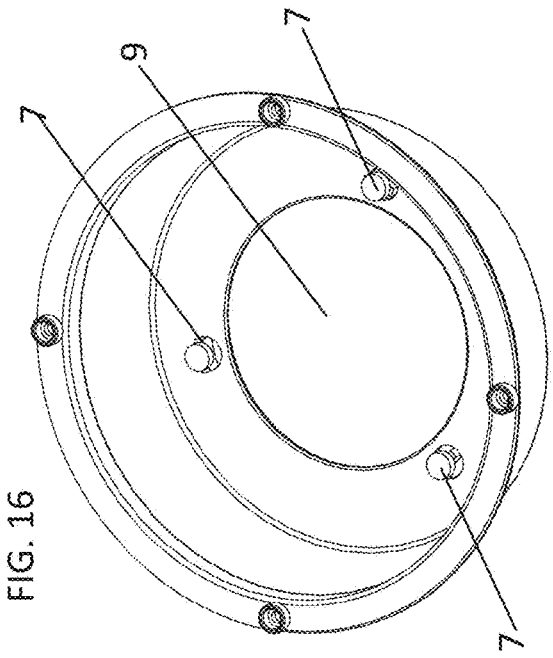
FIG. 18 is the perspective view of the outer housing.
Figure 15:
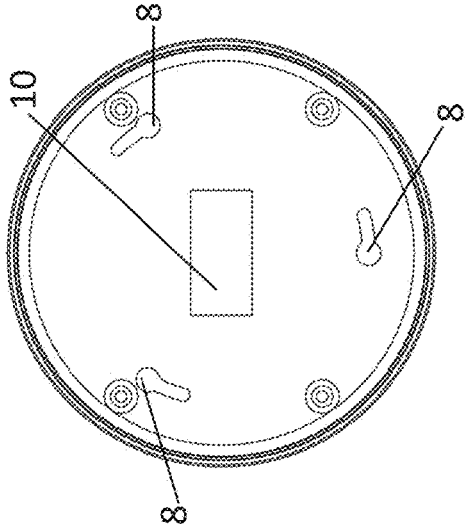
FIG. 15 is the bottom view of the inner housing according to an embodiment of the present application.
Figure 17:
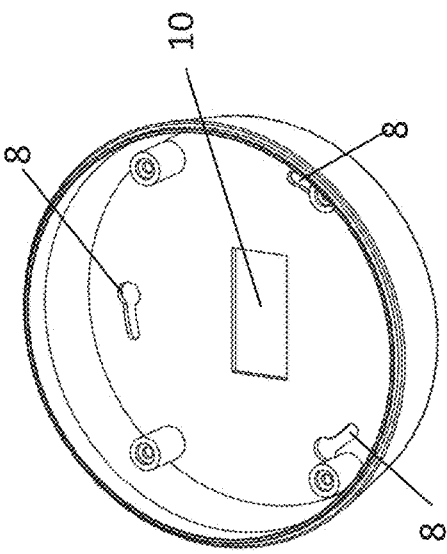
FIG. 17 is a perspective view of the inner housing.
Figure 20:
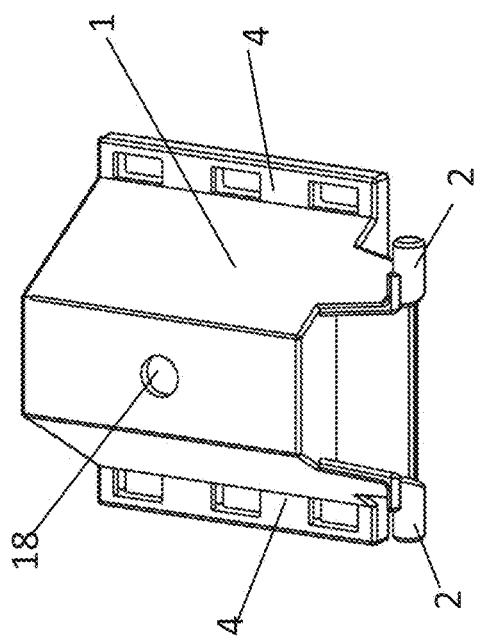
FIG. 20 is the perspective view of the projection unit according to the first embodiment of the present application.
Figure 22:
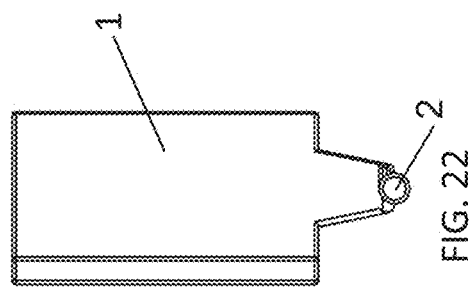
FIG. 22 is the side view of the projection unit according to the first embodiment of the present application.
Figure 19:
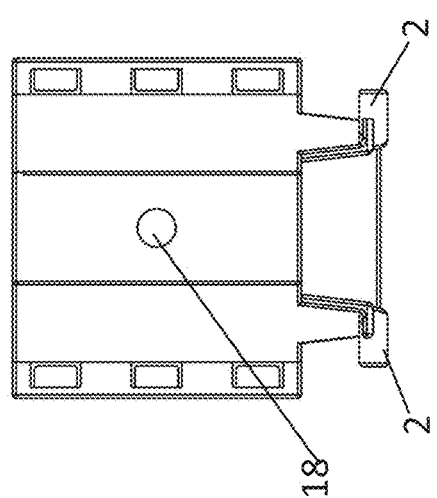
FIG. 19 is the back view of the projection unit according to the first embodiment of the present application.
Figure 21:
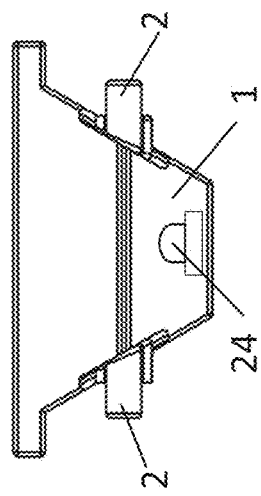
FIG. 21 is the bottom view of the projection unit according to the first embodiment of the present application.

In this case, module 34 can be configured to hold the rectangle projection film 26. Referring to FIG. 7, the module may include the following parts: an outer housing 5, a projection unit 1, an inner housing 6, a module base 16, a battery compartment 12 and a speaker 11 (for the function of playback music or sound). FIG. 7 is a comprehensive drawing of module 34 which may be configured to hold the rectangle projection film 26. FIG. 8 is the general assembly drawing of the construction of the module 34.

No matter which projection unit is used or configured on the module 34, the present patent application provides an embodiment to allow people to change the projection image inside the pumpkin without using any tools.

FIG. 8 also shows how this module 34 can be assembled and the general concept of making the projection film replaceable without using any tools.

Outer housing 5 may be a fixture to be attached to the bottom of the pumpkin shell 22 by using screws or any kind of adhesive glue. As shown in FIGS. 7-8 and FIGS. 11-14, the projection unit 1, inner housing 6, module base 16, battery compartment 12, battery compartment door 13 and speaker 11 can be attached together by screws or any other locking means. As shown in FIGS. 11-14, the projection unit 1 can be connected to the module 34 by frictionally engaging two hinge rods 2 in two c-shaped openings formed on two hinge rod-holding stands 3 on the module 34 respectively. The inner housing 6 can be attached to the power controller section to hold both hinge rods 2 securely onto the hinge rod-holding stands 3 and then form a hinged construction which can allow a user to adjust the projection angle. As a result, the user can adjust the projected image to the desired location on the pumpkin shell 22 by tilting the projection unit 1. Tilting the projection unit 1 up can move projected image 23 to a higher position on the pumpkin shell 22, and tilting the projection unit 1 down can move the projected image 23 to a lower position on the pumpkin shell 22. It is understood by one skilled in the art that the hinge construction can be in the form of any other possible hinge mechanism.

Figure 27:
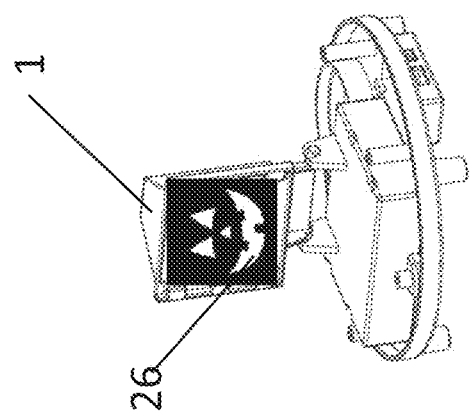
FIG. 27 is the perspective view of the projection module with projection film installed onto the projection unit according to the first embodiment of the present application.
Figure 24:
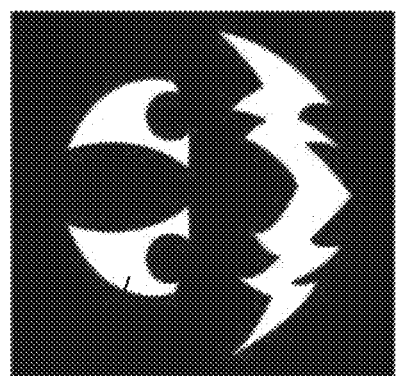
FIG. 24 is an example of the projection film design, called face B.
Figure 26:
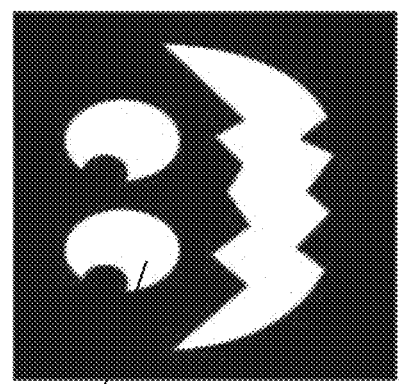
FIG. 26 is an example of the projection film design, called face D.
Figure 23:
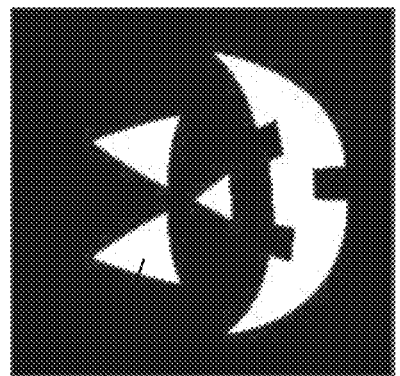
FIG. 23 is an example of the projection film design, called face A.
Figure 25:
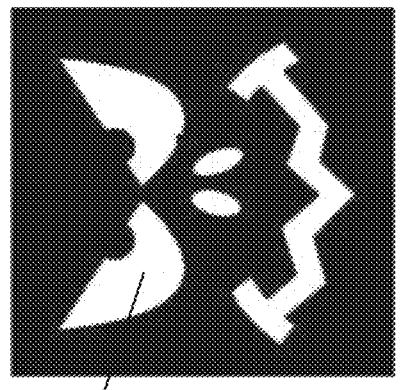
FIG. 25 is an example of the projection film design, called face C.

Projection unit 1 can be used to hold the rectangle projection film 26. FIGS. 23-26 are examples of different rectangle projection films 26 with different transparent images 30, 31, 32, 33, which can be placed at the front side of the projection unit 1 (as shown in FIG. 27). It is possible that the image 30, 31, 32, 33 is not transparent, whereas the area around the image 30, 31, 32, 33 is transparent. It is also possible that the image 30, 31, 32, 33 is transparent, whereas the area around the image 30, 31, 32, 33 is not transparent. It is also possible that the image 30, 31, 32, 33 can be a cut-out hole or silhouette where light can shine through the hole or the silhouette to project the desire image on the pumpkin shell 22 from its interior. Film holders 4 can be formed on the front edges of the opening of projection unit 1 to hold the rectangle projection film 26. Users can replace the projection film by pulling out the old one and sliding in a new one. After the film is securely fastened on the projection unit 1, the users can put the whole module 34 back in the pumpkin shell 22 by a simple process. The users can insert the module 34 through the opening on the bottom of the pumpkin shell 22. The projection unit 1 should be able to go through a hole 9 on the outer housing 5 which can be fixed on the pumpkin shell 22 permanently. The user can insert all three locking knobs 7 (molded on the outer housing 5) into three corresponding key-shaped locking holes 8 on the inner housing 6, and turn the whole module 34 clockwise to lock it into place. Turning the whole module 34 anti-clockwise can unlock the module 34 from the pumpkin shell 22. It is understood by one skilled in the art that the module 34 can be attached to the bottom of the pumpkin shell 22 in other possible ways without using the outer housing 5 and/or the inner housing 6. For example, the module base 16 of the module 34 may be provided with snap-fit elements that can be releasably snap-fitted onto corresponding snap-fit elements formed on the bottom opening of the pumpkin shell 22.

FIGS. 19-22 show different views of the projection unit 1. An LED hole 18 can be provided to hold an LED 24 which may serve as a projection light source inside the projection unit 1. Film holders 4 may be provided on the front edges of the opening of the projection unit 1. The film holders 4 can be used to hold rectangle projection film 26. Two hinge rods 2 may be provided on the bottom of the projection unit 1, which can be attached to the hinge rod holding stands and covered by the inner housing 6 to form a hinge construction which can allow user to adjust the projection angle.

As shown in FIGS. 7-10, a battery compartment 12 can be provided to hold three AA batteries which can be used as a power supply of the module 34. A speaker cavity 17 can be provided to hold a speaker 11. The device will be able to playback music or sound effect if speaker 11 is installed.

As shown in FIG. 12 and FIG. 14, the module 34 can also be configured to use Li-Polymer rechargeable battery. If Li-Polymer rechargeable battery is used, a micro USB port 21 can be provided for the purpose of charging the battery. Rechargeable battery can be recharged by connecting the module 34 to a USB charger or the USB port on a computer via a USB charging cable.

Both AA batteries in the battery compartment 12 and Li-Polymer rechargeable battery can provide power to light up the LED in the projection unit 1 to work as a light source in the projection unit 1. Once the light source is on, the projected image 23 will be projected on the pumpkin shell from its interior.

If Bluetooth® technology is used, speaker 11 can play music or sound once the device is successfully connected to any mobile device via the Bluetooth® technology.

If an integrated circuit (IC) is provided, the speaker 11 can playback pre-recorded music or sound stored in an IC chip.

Embodiment 2

Figure 3:
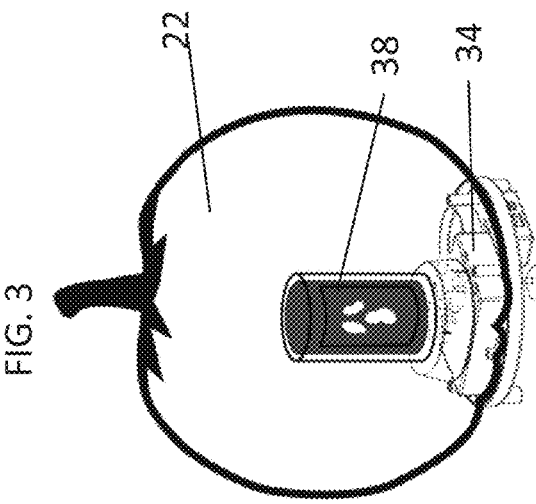
FIG. 3 is the perspective view of the projection module inside the pumpkin shell, and the projection module has a dome-shaped projection unit on it according to an embodiment of the present application.
Figure 30:
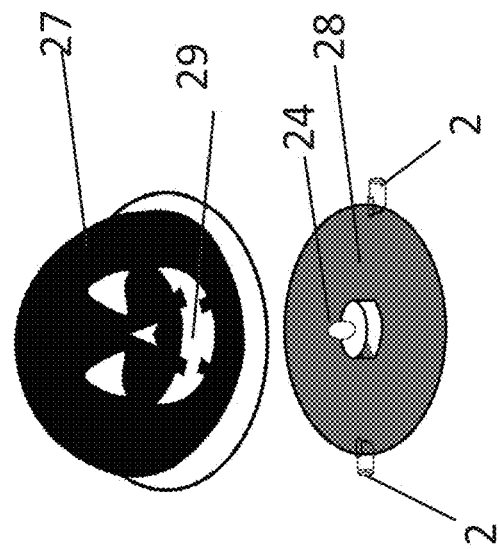
FIG. 30 is the drawing of the dome-shaped projection unit and the base of the dome-shaped projection unit according to the second embodiment of the present application.
Figure 29:
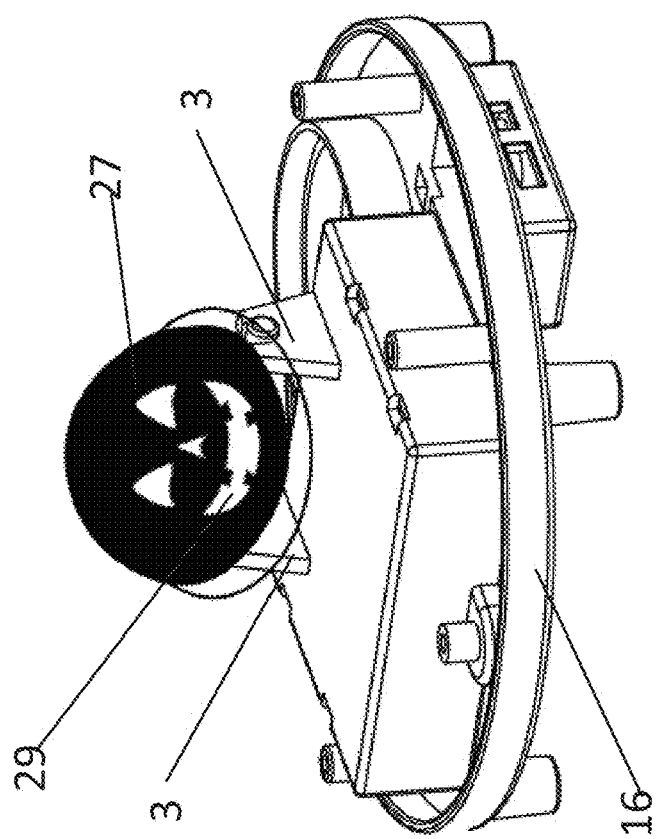
FIG. 29 is the perspective view of the dome-shaped projection unit according to the second embodiment of the present application.

The projection section can be configured as a dome-shaped projection unit 27 (See FIG. 3, FIG. 29 and FIG. 30).

In this configuration, module 34 can be configured to hold a dome-shaped projection unit 27. It may include the following parts: an outer housing 5, a dome-shaped projection unit 27, an inner housing 6, a module base 16, a battery compartment 12 and a speaker 11 (for the function of playback music or sound). FIG. 3 is a drawing of the module 34 which can be configured to hold the dome-shaped projection unit 27.

The present patent application also provides an embodiment to allow users to have the option of changing the projection image inside the pumpkin without using any tools.

A user can simply insert the module 34 in the pumpkin shell 22 through an opening on the bottom of the pumpkin shell 22. The dome-shaped projection unit 27 should be able to go through the hole 9 on the outer housing 5 which can be fixed on the pumpkin shell 22 permanently. The user can insert all three locking knobs 7 (molded on the outer housing 5) into three corresponding key-shaped locking holes 8 on the inner housing 6 and turn the whole module 34 clockwise to lock it into place. Turning the whole module 34 anti-clockwise can unlock the module 34 from the pumpkin shell 22. It is understood by one skilled in the art that the module 34 can be attached to the bottom of the pumpkin shell 22 in other possible ways without using the outer housing 5 and/or the inner housing 6. For example, the module base 16 of the module 34 may be provided with snap-fit elements that can be releasably snap-fitted onto corresponding snap-fit elements formed on the bottom opening of the pumpkin shell 22.

FIG. 30 shows an example of the dome-shaped projection unit 27 and a base of the dome-shaped projection unit 28. Two hinge rods 2 may be provided on the bottom of the base of dome-shaped projection unit 27. Two hinge rods 2 on the bottom of the base of dome-shaped projection unit 28 can be attached to the hinge rod holding stands 3 and form a hinge construction which can allow users to adjust the projection angle. A transparent image 29 can be provided on the dome-shaped projection unit 27. It is possible that the image 29 is not transparent, whereas the area around the image 29 is transparent. It is also possible that the image 29 is transparent, whereas the area around the image 29 is not transparent. It is also possible that the image 29 can be a cut-out hole or silhouette where light can shine through the hole or the silhouette to project the desire image on the pumpkin shell 22 from its interior. The transparent image 29 on the dome-shaped projection unit 27 can be changed by changing to another dome-shaped projection unit 27 with a different transparent image on the dome-shaped projection unit. Users can choose the one with a face design to project the face illusion on the pumpkin shell 22 or the one with various graphics all over the dome-shaped projection unit 27 to project graphics on to the whole pumpkin shell 22 from its interior.

As shown in FIGS. 7-10, a battery compartment 12 may be provided to hold three AA batteries which can serve as a power supply of the module 34. A speaker cavity 17 may be provided to hold a speaker 11. The device will be able to playback music or sound if the speaker 11 is installed.

As shown in FIG. 12 and FIG. 14, the module 34 can also be configured to use Li-Polymer rechargeable battery. If Li-Polymer rechargeable battery is used, there should be a micro USB port 21 provided for the purpose of charging the battery. Rechargeable battery can be recharged by connecting the module 34 to a USB charger or a USB port on a computer via a USB charging cable.

Both AA batteries in the battery compartment 12 and Li-Polymer rechargeable battery can provide power to light up LED 24 in the dome-shaped projection unit 27 to work as a light source in the projection unit. Once the light source is on, it will project the projected image 23 on the pumpkin shell from its interior.

If Bluetooth® technology is used, the speaker 11 can play the music or sound effect once the device is successfully connected to any mobile device via the Bluetooth® technology.

If an integrated circuit (IC) is used, the speaker 11 can playback pre-recorded music or sound stored in an IC chip.

Embodiment 3

Figure 6:
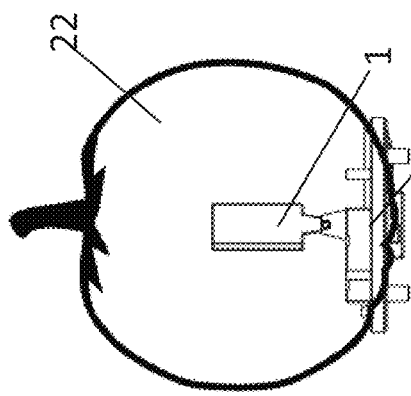
FIG. 6 is the perspective view of the pumpkin-shaped device with cylinder-shaped projection unit in the pumpkin shell.
Figure 33:
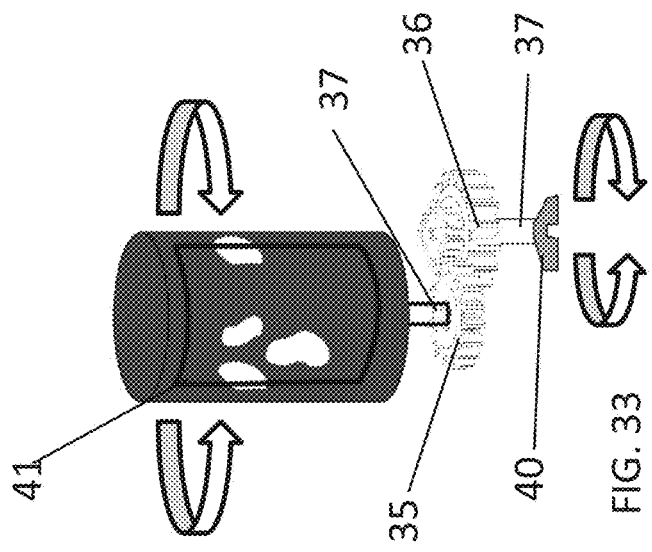
FIG. 33 shows the mechanical construction of the rotatable device on the cylinder-shaped projection unit according to the third embodiment of the present application.
Figure 31:
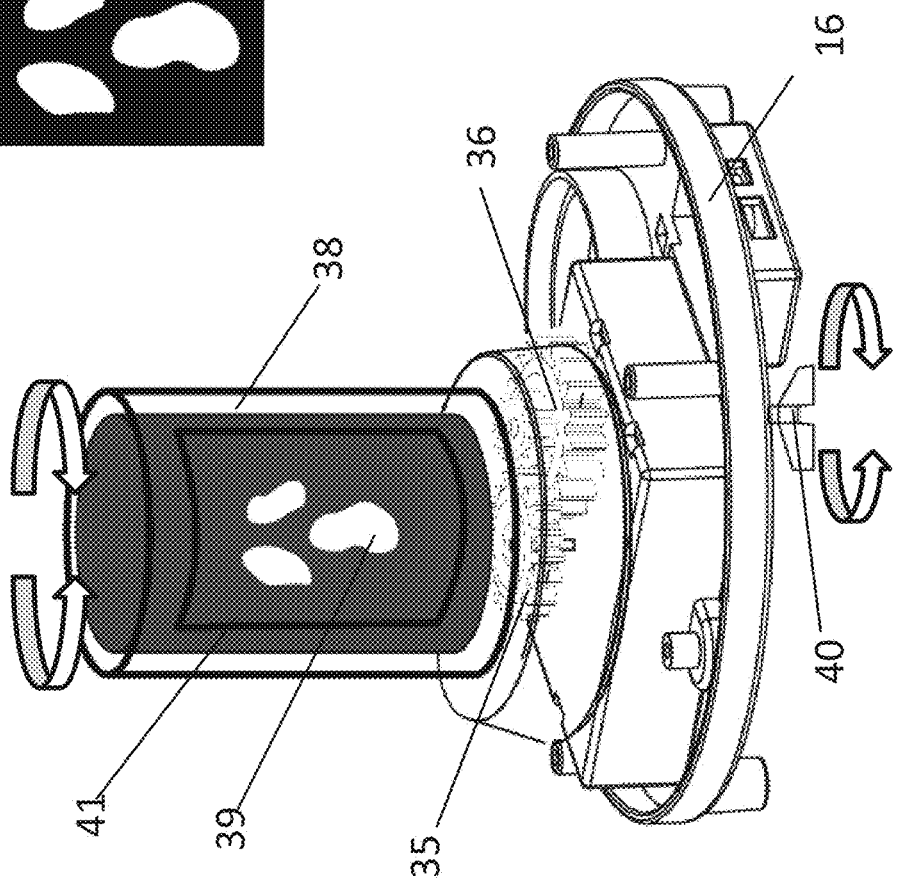
FIG. 31 is the perspective view of the cylinder-shaped projection unit according to the third embodiment of the present application.

The projection section can be configured as a rotatable cylinder-shaped projection unit 38 (See FIG. 6, FIG. 31 and FIG. 33).

In this configuration, module 34 can be configured to hold a rotatable cylinder-shaped projection unit 38. It may include the following parts: an outer housing 5, a cylinder-shaped projection unit 38, an inner housing 6, module base 16, battery compartment 12 and speaker 11 (for the function of playback music or sound). FIG. 6 is a drawing of the module 34 which can be configured to hold a rotatable cylinder-shaped projection unit 38.

The cylinder-shaped projection unit 38 can be rotatable, so users can change the projection image by turning a switch 40 located at the bottom of the module 34.

Figure 32:
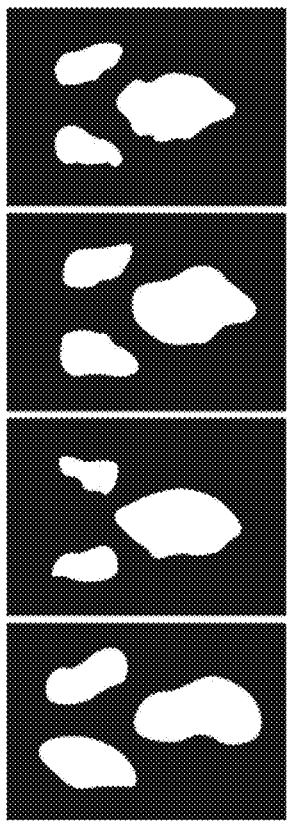
FIG. 32 shows the examples of different face image on the projection film.

FIG. 32 is examples of different projection films 39 with different transparent images, which can be placed into the cylinder-shaped projection unit 38 (as shown in FIG. 31).

The cylinder-shaped projection unit 38 may have an opening 41 at the front. An LED light may be fixed inside the cylinder-shaped projection unit 38. The LED may serve as a light source inside the cylinder-shaped projection unit 38. When the LED is turned on and it works as a light source to project the image printed on the projection film 39 onto the pumpkin shell from its interior.

To change the projection image under this configuration, users do not have to take the whole module 34 out. People can easily change the projection image by turning the switch 40 at the bottom of the module 34. Gear 35 and a spinning plate in the cylinder-shaped projection unit 38 may be connected with a shaft 37. Gear 36 and the switch 40 may be connected by another shaft 37'. When a user turns the switch 40 clockwise, gear 36 will turn clockwise and drive gear 35 to turn anti-clockwise. Since gear 35 and a spinning plate in the cylinder-shaped projection unit 38 are connected, so the spinning plate will also turn anti-clockwise. As a result, the projection film 39 fixed on the spinning plate will be rotated anti-clockwise. If another face or graphic printed on the projection film 39 is rotated to the location where the light source can shine through the projection film 39 and the opening 41, then it will project another face or graphic illusion onto the pumpkin shell from its interior.

As shown in FIGS. 7-10, a battery compartment 12 may be provided to hold three AA batteries which can serve as a power supply for the module 34. A speaker cavity 17 can be provided to hold a speaker 11. The device will be able to playback music or sound if the speaker 11 is installed.

As shown in FIG. 12 and FIG. 14, the module 34 can also be configured to use Li-Polymer rechargeable battery. If Li-Polymer rechargeable battery is used, there should be a micro USB port 21 provided for the purpose of charging the battery. Rechargeable battery can be recharged by connecting the module 34 to a USB charger or a USB port on a computer via a USB charging cable.

Both AA batteries in the battery compartment 12 and Li-Polymer rechargeable battery can provide power to light up the LED in the cylinder-shaped projection unit 38 to work as a light source in the projection unit. Once the light source is on, it will project the projected image 23 on the pumpkin shell from its interior.

If Bluetooth® technology is used, the speaker 11 can play the music or sound once the device is successfully connected to any mobile device via the Bluetooth® technology.

If integrated circuit is configured, the speaker 11 can playback pre-recorded music or sound effect stored in an IC chip.

Embodiment 4

As another embodiment of a rotatable cylinder-shaped projection unit 38 (See FIGS. 34-38) this option provides users an option to switch the projection image by pressing a button on the bottom of the module base 16.

In this configuration, module 34 can be configured to hold a rotatable cylinder-shaped projection unit 38. It may include the following parts: an outer housing 5, a cylinder-shaped projection unit 38, an inner housing 6, module base 16, button 42, shaft connector 43, shaft 44, joint 45, four-side film holder 46, spring 47, star gear 48, battery compartment 12 and speaker 11 (for the function of playback music or sound). FIG. 34 is a drawing of the module 34 which can be configured to hold an automatic rotatable cylinder-shaped projection unit 38.

The cylinder-shaped projection unit 38 can be rotatable, so users can change the projection image by pressing the button 42 located at the bottom of the module 34.

FIG. 32 is examples of different projection film 39 designs, which can be placed into the cylinder-shaped projection unit 38 (as shown in FIG. 31).

The cylinder-shaped projection unit 38 may have an opening 41 at the front. An LED light may be fixed inside the cylinder-shaped projection unit 38. The LED may serve as a light source inside the cylinder-shaped projection unit 38. When the LED is turned on and it works as a light source to project the image printed on the projection film fixed on the four-side film holder onto the pumpkin shell from its interior. It is possible that the image is not transparent, whereas the area around the image is transparent. It is also possible that the image is transparent, whereas the area around the image is not transparent. It is also possible that the image can be a cut-out hole or silhouette where light can shine through the hole or the silhouette to project the desire image on the pumpkin shell 22 from its interior.

To change the projection image under this configuration, users do not have to take the whole module 34 out. Users can easily change the projection image by pressing a button 42 at the bottom of the module 34, as shown in FIGS. 34, 35, 35*a* and 36. When the button 42 is pressed, a shaft connector 43, which may be connected with the button 42, is moved in a direction towards a biasing spring 47 to thereby compress the spring 47. The spring 47 may be mounted on a rod 45, which may be connected to one side of the shaft connector 43 opposite to the button 42. When the shaft connector 43 is moved, a pointy tooth 49 provided thereon can engage with a 4-tooth gear 48, which may be mounted on a lower end of a central shaft 44 provided on the four-sided film holder 46. When the button 42 is pressed, the 4-tooth gear 48 will rotate forty-five degrees anti-clockwise by the pointy tooth 49, and the shaft 44 will also rotate forty-five degrees anti-clockwise. Then, the four-sided film holder 46, which is connected to the shaft 44, will rotate forty-five degrees. As a result, an adjacent side of the four-sided film holder 46 will be facing the opening 41. The image on that adjacent side of the four-sided film holder 46 will then be the image to be projected from the projection unit. Since the spring 47 is mounted on the rod 45, which is connected with the shaft connector 43, the shaft connector 43 will return to its original position under the biasing force of the spring 47 when the button 42 is not being pressed. The shaft connector 43, when returned to its original position, is configured to hold the 4-tooth gear 48 in place until the button 42 is pressed again.

As shown in FIGS. 7-10, a battery compartment 12 may be provided to hold three AA batteries which can serve as a power supply for the module 34. A speaker cavity 17 may be provided to hold a speaker 11. The device will be able to playback music or sound if the speaker 11 is installed.

As shown in FIG. 12 and FIG. 14, the module 34 can also be configured to use Li-Polymer rechargeable battery. If Li-Polymer rechargeable battery is used, there should be a micro USB port 21 provided for the purpose of charging the battery. Rechargeable battery can be recharged by connecting the module 34 to a USB charger or a USB port on a computer via a USB charging cable.

Both AA batteries in the battery compartment 12 and Li-Polymer rechargeable battery can provide power to light up the LED in the cylinder-shaped projection unit 38 to work as a light source in the projection unit. Once the light source is on, it will project the projected image 23 on the pumpkin shell from its interior.

If Bluetooth® technology is adopted, the speaker 11 can play the music or sound once the device is successfully connected to any mobile device via the Bluetooth® technology.

If integrated circuit (IC) is used, the speaker 11 can playback pre-recorded music or sound effect stored in an IC chip.

Embodiment 5

The projection section can also be configured as a separate projection unit 50 which can be mounted on the surface of the pumpkin shell 22 (See FIG. 28). The separate projection unit 50 may include a separate light source and a separate projection film with a separate image. The separate projection unit 50 may be dome-shaped or may have another shape.

In this embodiment, the projection unit 50 can generate an enlarged projection illusion 25 on a surface facing the separate project unit 50, such as a wall or a background. The light source can either be an LED connected to the module 34 or an electric light from outside. Particularly, a C7 electric light can be plugged into the outlet. Bluetooth® speaker can be added to the device, so users can play their favorite music, sound effects or pre-recorded message with this Bluetooth® pumpkin speaker from their mobile device via Bluetooth® technology, which can create a great add-on feature to a Halloween decoration.

Although it has been shown and described above that the projection device with projection images is designed for Halloween holiday, it is understood that the projection device with projection images can be designed for any other holidays, festivals and parties.

Figure 39:
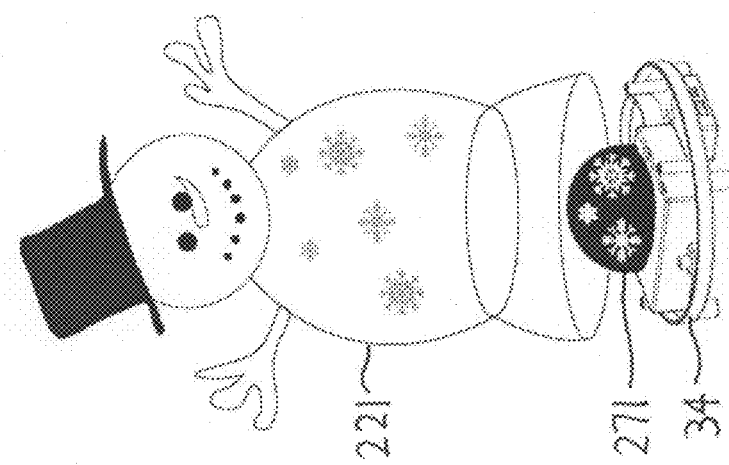
FIG. 39 is a decoration device with projection images for Christmas holiday according to an embodiment of the present application.
Figure 44:
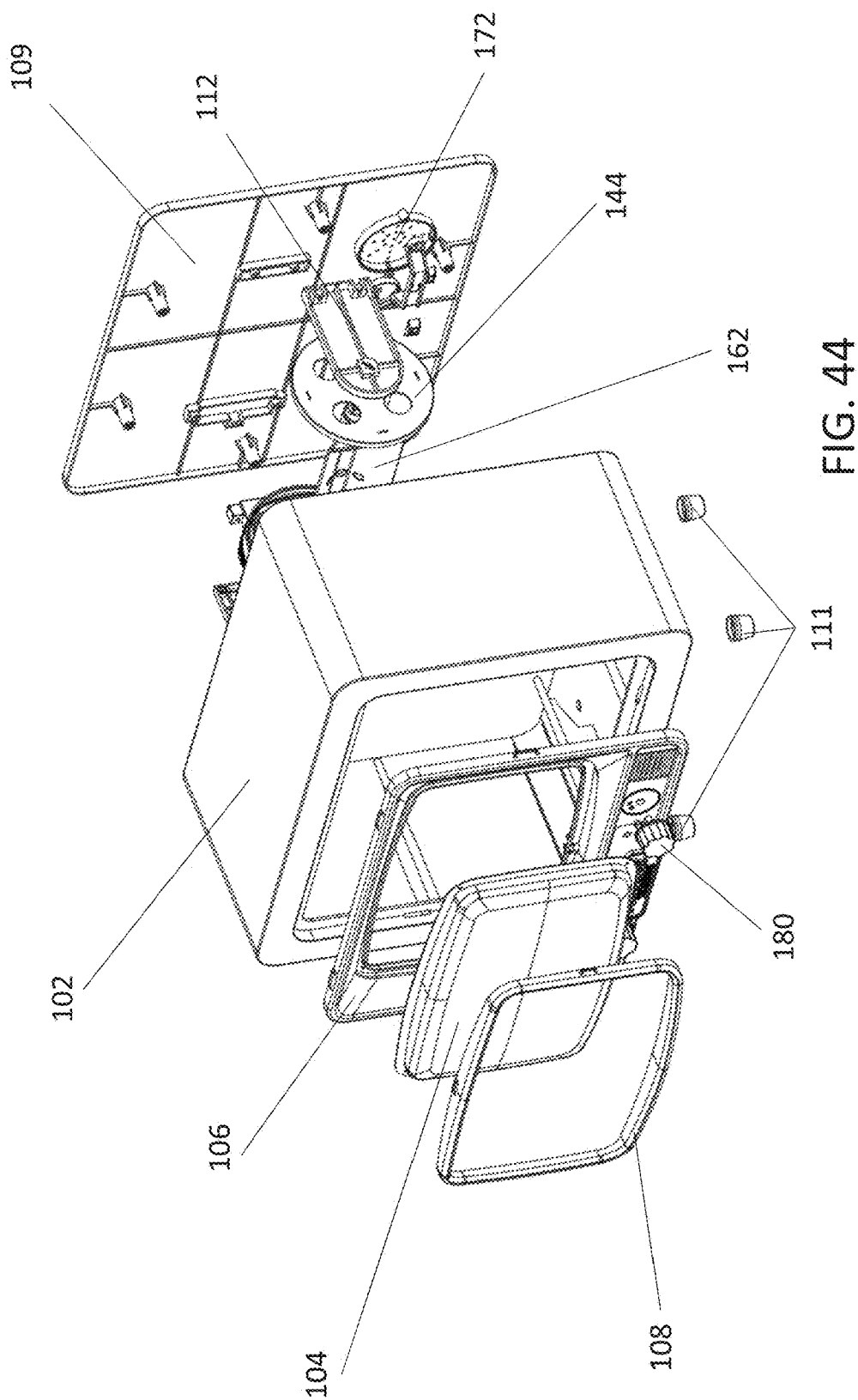
FIGS. 44-46 are different exploded views of the projection device of the present application.
Figure 45:
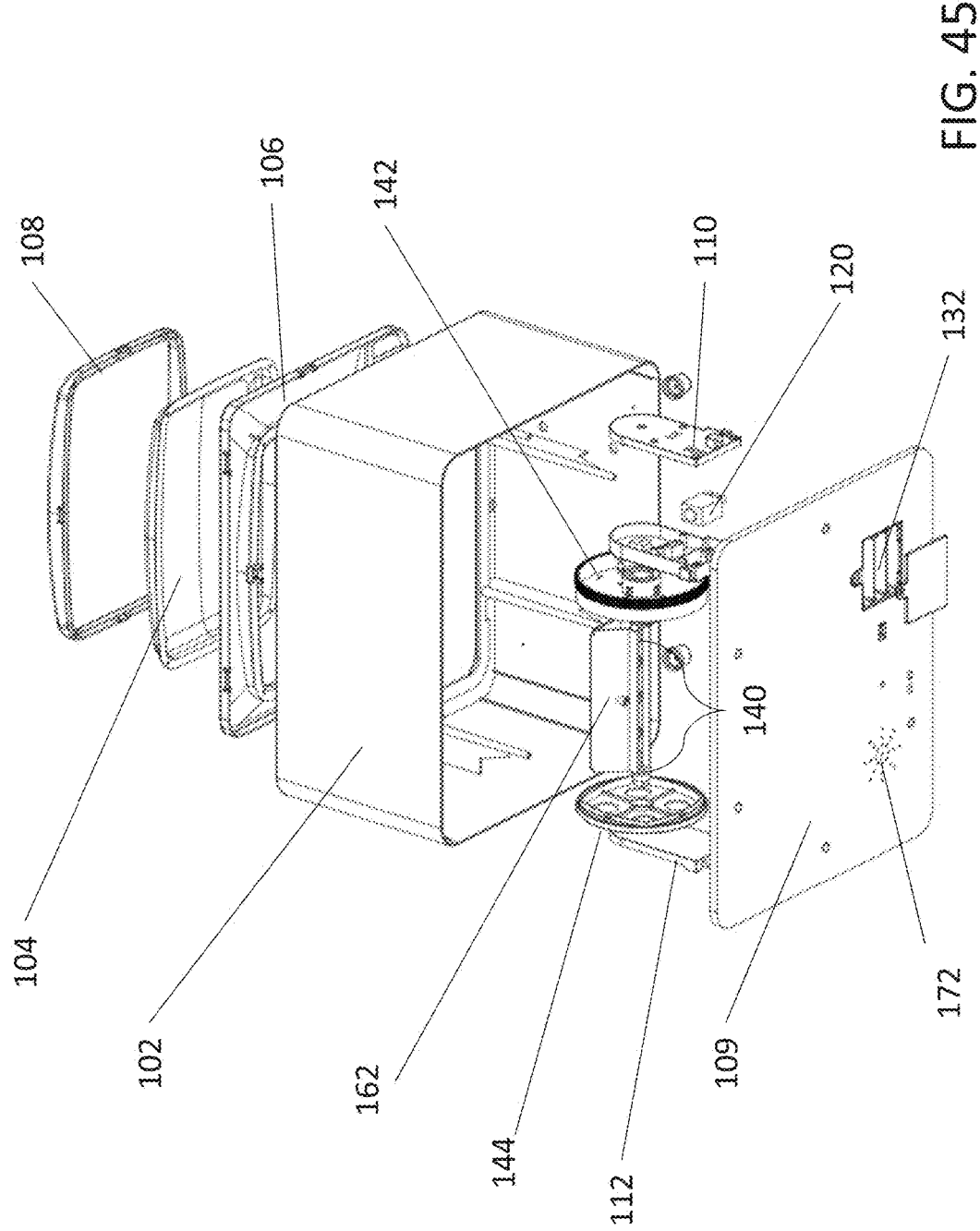
Figure 46:
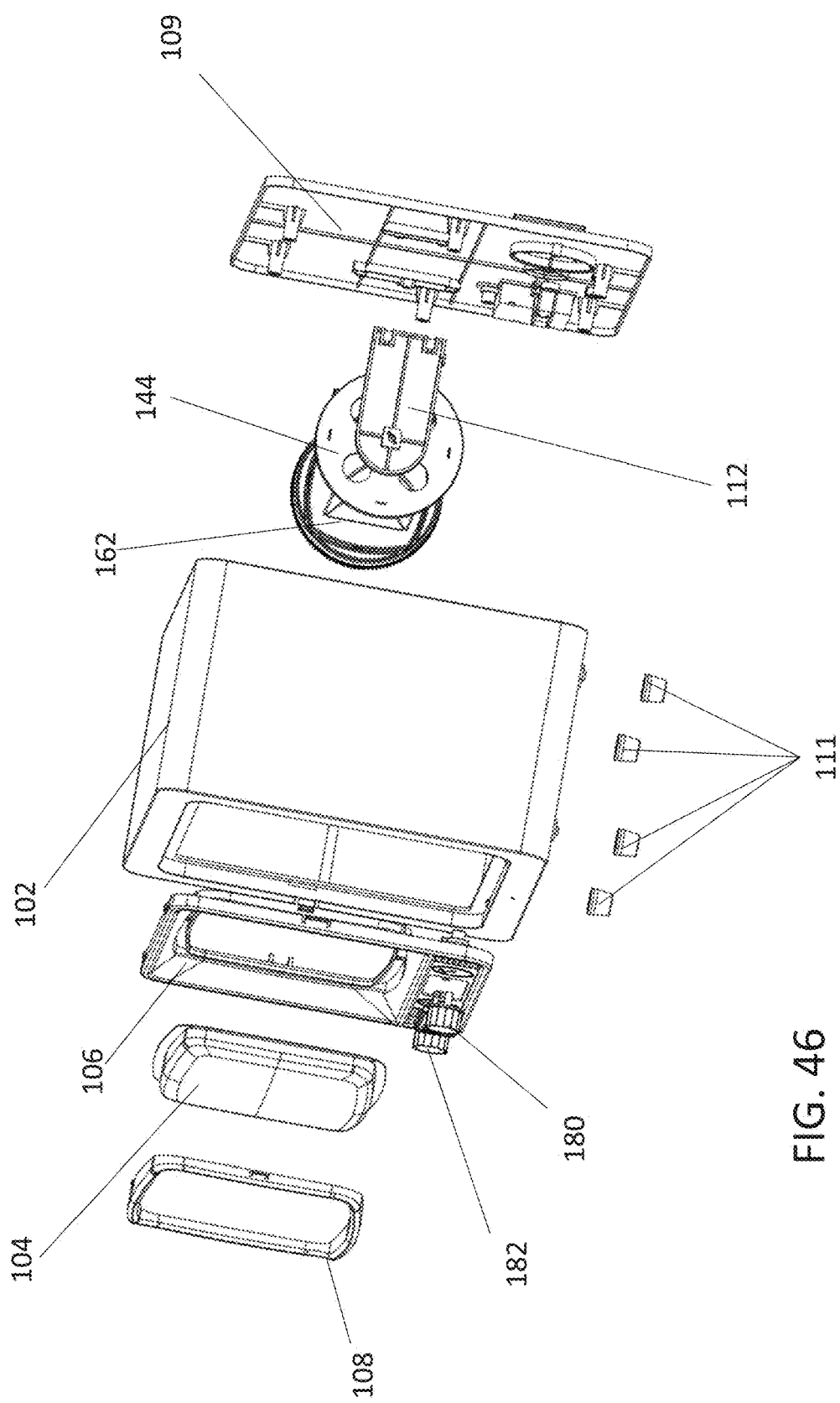
Figure 52:
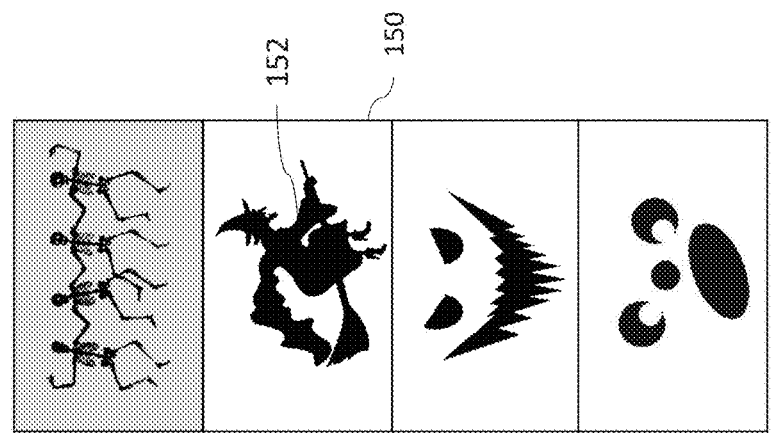
FIG. 52 is a projection film of the projection device according to an embodiment of the present application.
Figure 51:
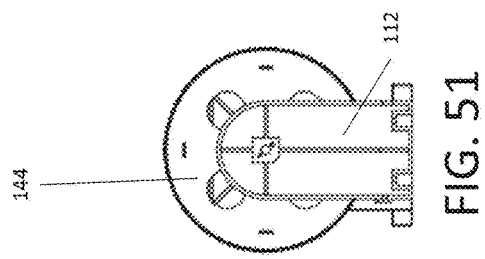
FIGS. 47-51 are different views of the projection module frame and projection roller frame of the projection device according to an embodiment of the present application.
Figure 50:
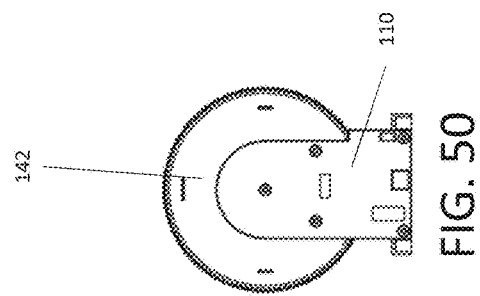

FIG. 39 is a projection device with projection images for Christmas holiday according to an embodiment of the present application. It may include a module 34, a dome-shaped projection unit 271 with snowflake images mounted on the module 34, and a snowman-shaped shell 221.

Figure 40:
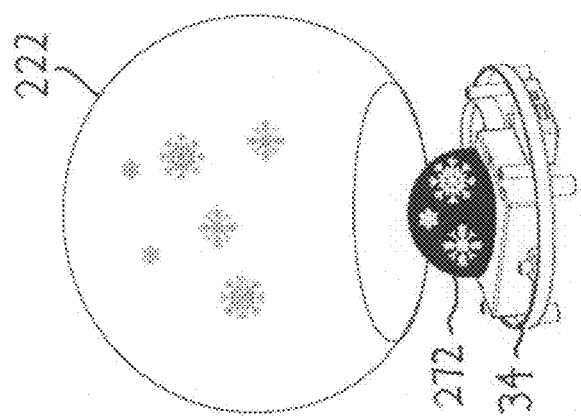
FIG. 40 is a decoration device with projection images for any holiday, festival and party according to an embodiment of the present application.

FIG. 40 is a projection device with projection images for any holiday, festival or party according to an embodiment of the present application. It may include a module 34, a dome-shaped projection unit 272 with snowflakes or any images mounted on the module 34, and a circular shell 222.

Figure 41:
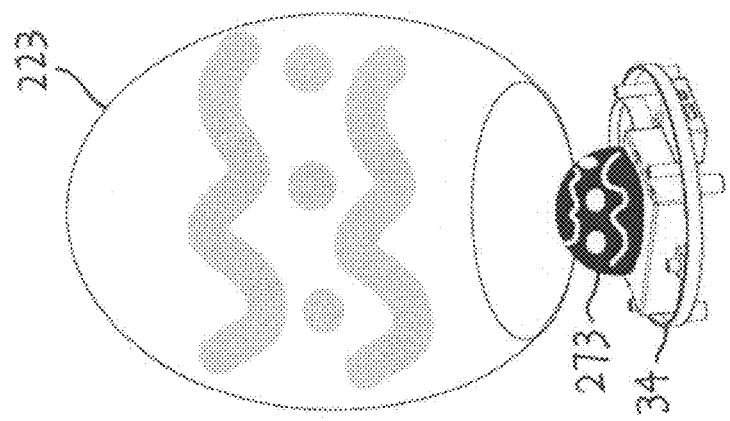
FIG. 41 is a decoration device with projection images for Easter holiday according to an embodiment of the present application.

FIG. 41 is a projection device with projection images for Easter holiday according to an embodiment of the present application. It may include a module 34, a dome-shaped projection unit 273 with Easter egg design images mounted on the module 34, and an egg-shaped shell 223.

Embodiment 6

FIGS. 42-59 show a projection device 100 for projecting images on a surface of the projection device according to an embodiment of the present application. As shown in FIGS. 42 and 43, the projection device 100 may be in the shape of a cubic television set. An image 152 can be projected on a front translucent screen 104 of the projection device.

As best illustrated in FIGS. 44-54, the projection device 100 of the present application may include an outer housing 102 provided with the front translucent screen 104, a projection module frame 110, 112 mounted on an inner surface of the outer housing 102, and a projection roller frame 140, 142, 144 supported by the projection module frame. The projection roller frame may include first and second spaced apart rollers 142, 144 rotatable respectively on two opposite cylindrical ends 140, 140 integrally formed on a lampshade 162. The first and second rollers 142, 144 may be disc-shaped rollers. The outer housing 102, the projection module frame 110, 112, and the projection roller frame 140, 142, 144 may be made of plastic or other suitable material.

Figure 54:
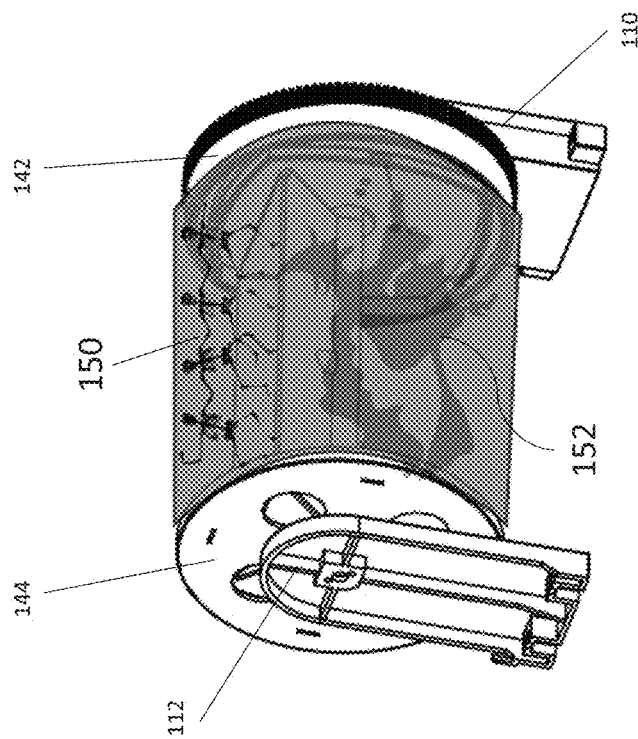
FIG. 54 is a perspective view of the projection module frame and projection roller frame in FIG. 53 with the projection film installed.
Figure 53:
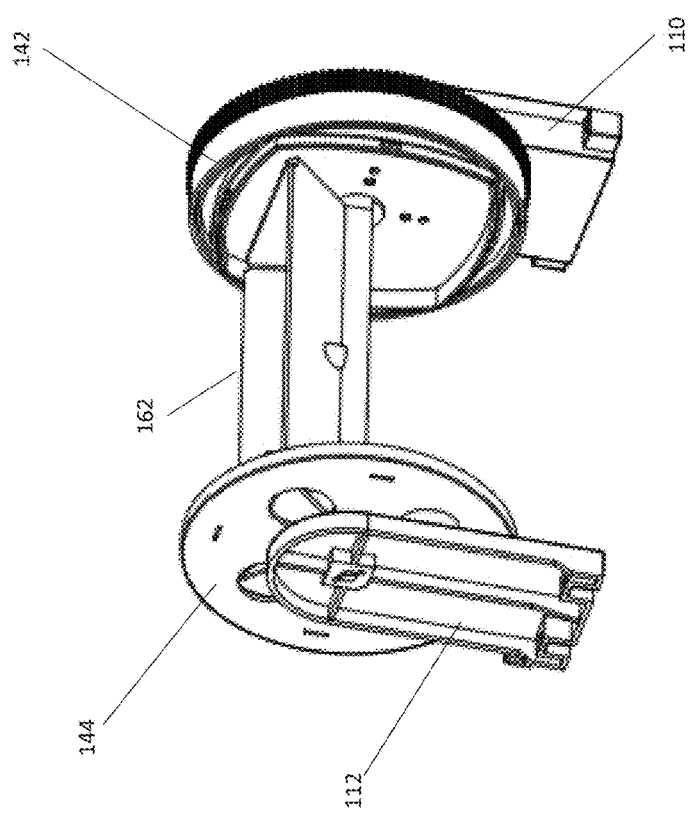
FIG. 53 is a perspective view of the projection module frame and projection roller frame of the projection device according to an embodiment of the present application.

As depicted in FIG. 54, a projection film 150 may be curled up and held between the first and second rollers 142, 144. The projection film 150 may include at least one image 152. Four images are shown in the present embodiment. The image 152 on the projection film 150 may be transparent image, non-transparent image, cut-out hole or silhouette.

Figure 47:
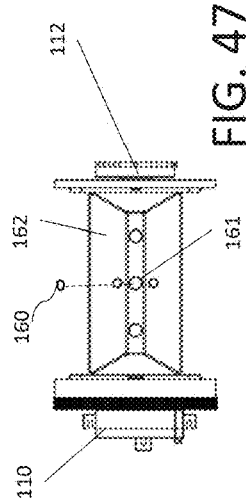
Figure 48:
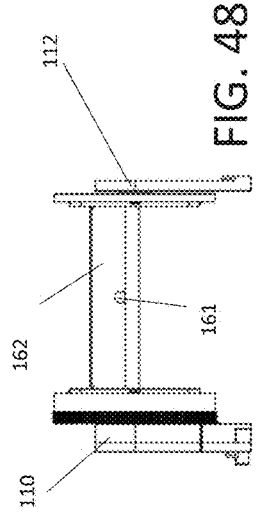
Figure 49:
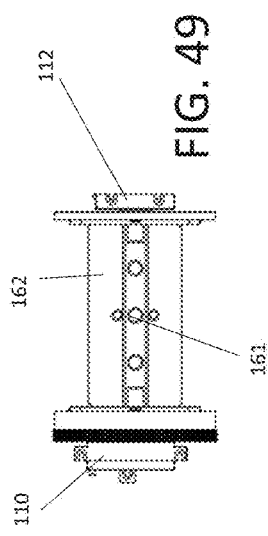

As shown in FIG. 47, a light source 160 may be mounted on a fixing hole 161 formed at a center of the lampshade 162. The light source 160 can be an LED light source or any other suitable light source. The light source 160 may be mounted inside the lampshade 162 so that the image 152 formed on the projection film 150 can be projected on the front translucent screen 104 by the light source. The lampshade 162 may be sized and shaped to direct light from the light source towards the front translucent screen.

The projection module frame may include a first projection module frame member 110, and a second projection module frame member 112 spaced apart from the first projection module frame member. The first and second projection module frame members 110, 112 may be secured on an inner surface of a panel of the outer housing 102. In the illustrated embodiment, the first and second projection module frame members 110, 112 may be secured on an inner surface of the rear panel 109 of the outer housing 102. The first projection module frame member 110 may be in the form of an inner casing.

One of the two opposite cylindrical ends 140 may be coupled with the first projection module frame member 142, and another one of the two opposite cylindrical ends 140 may be coupled with the second projection module frame member 144.

As illustrated in FIGS. 55-57, a motor 120 and a gear mechanism 121-125 may be accommodated inside the inner casing 110. The gear mechanism may include a worm rod 121 mounted on a motor shaft (not shown) of the motor 120, a first gear 122 fixed on a gear shaft 123 and engaged with the worm rod 121, a second gear 124 fixed on the gear shaft 123 and engaged with an external ring gear 125 provided on an outer circumference of the first roller 142.

The projection film 150 may have a first end held in a groove 143 (shown in FIG. 57) formed on an inner surface of the first roller 142, and a second end held in another groove (not shown) formed on an inner surface of the second roller 144 facing the inner surface of the first roller 142. The projection film may be cylindrical in shape, or in any other possible shape.

The outer housing 102 may be in the shape of a cubic television set, and may include a face panel 106 provided at a front side of the outer housing, and a pressing frame 108 press-fitting the front translucent screen 104 on the face panel 106. A switching knob 180 may be provided on the face panel 106 for activating the device or switching power on or off.

The projection device 100 may further include a speaker 170 mounted on the rear panel 109. A volume control knob 182 may be provided on the face panel 106 for adjusting volume of the speaker. The speaker 170 may be a Bluetooth® speaker and Bluetooth® technology can be used for communication between the speaker and a mobile device (not shown) so that the speaker can play music and sound from the mobile device. The speaker 170 may be located behind a plurality of apertures 172 formed on the rear panel 109.

Figure 58:
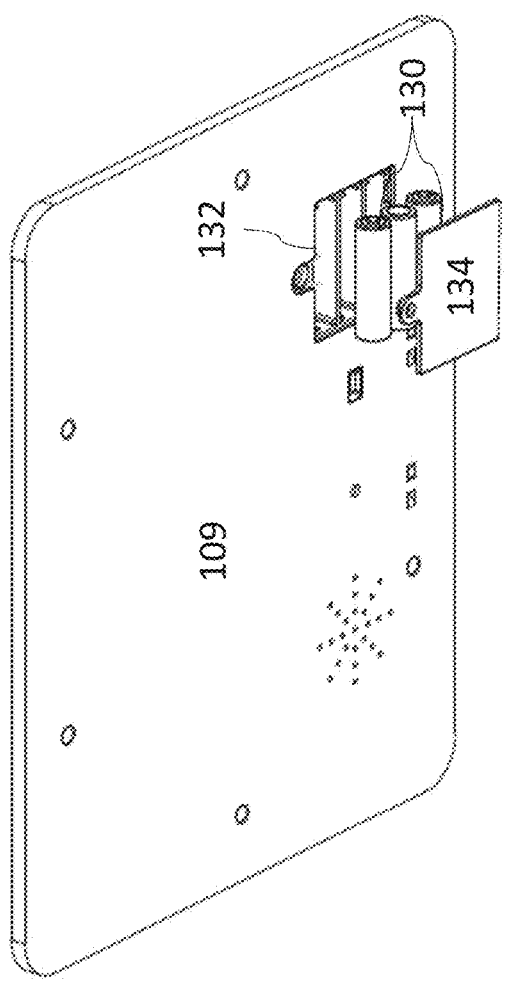
FIG. 58 is a perspective view of a rear panel of the projection device showing a battery compartment according to an embodiment of the present application.
Figure 59:
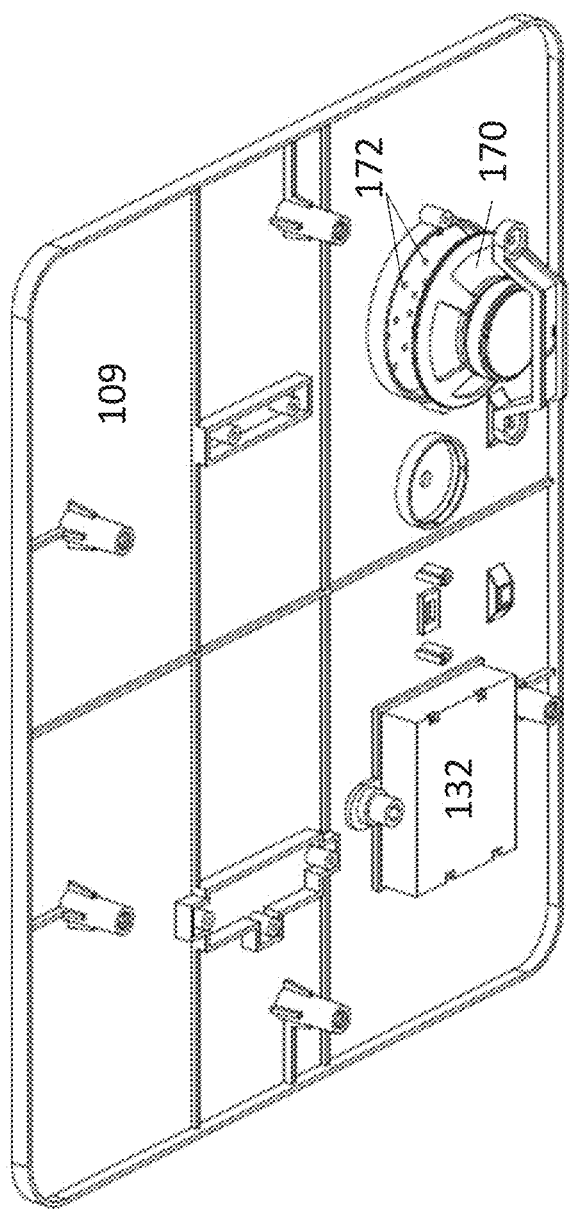
FIG. 59 is a perspective view of the rear panel of the projection device showing a speaker according to an embodiment of the present application.

As best illustrated in FIG. 58, a plurality of batteries 130 may be held in a battery compartment 132 which may be formed on the rear panel 109 of the outer housing 102 to supply electricity to the motor 120, speaker 170 and light source 160. A cover 134 may be used to cover the battery compartment 132 and allow easy access to the batteries in case replacement is necessary. Electric wires (not shown) may be provided to electrically connect the electric components of the projection device.

Four foot pad 111 may be provided at the bottom of the outer housing 102.

FIG. 60 is a perspective view of a position-limiting mechanism of the projection device according to an embodiment of the present application.

The projection device 100 may further include a position-limiting mechanism 200 for limiting the position of the first roller 142. The position-limiting mechanism 200 may include a cylindrical member 202 formed at a center of a surface of the first roller 142 facing the first projection module frame member 110. The outer circumference of the cylindrical member 202 may be formed with a plurality of switch actuators 204. The switch actuators 204 may be in the form of protrusions formed equidistantly around the outer circumference of the cylindrical member 202.

A switch 206 may be provided on a switch box 208 formed on a surface of the first projection module frame member 110 facing the first roller 142. The switch 206 can be connected with an integrated circuit (not shown) mounted inside the switch box 208, and can be actuated by the switch actuators 204.

The position-limiting mechanism 200 may further include a pin 210 having an enlarged head, and a spring 212 mounted around the pin 210 for biasing the enlarged head of the pin 210 against the surface of the first roller 142 facing the first projection module frame member 110. The pin 210 may be slidably received in a sleeve 214 formed on the surface of the first projection module frame member 110 facing the first roller 142.

A plurality of recesses 218 may be formed on the surface of the first roller 142 around the cylindrical member 202. The number of recesses 218 may equal to the number of switch actuators 204. The enlarged head of the pin 210 may engage with one of the recesses 218.

When the motor 120 is started, the first roller 142 will rotate until the switch 206 is actuated by one of the switch actuators 204. When the switch 206 is actuated, the integrated circuit is configured to switch off the motor 120. After the motor 120 is switched off, the motor shaft may still continue to rotate a certain degree due to inertia before it comes to a complete stop.

To precisely restrict the rotation of the first roller 142, the pin 210 will come into contact with one of the recesses 218, and the enlarged head of the pin 210 will be caught and held by the recess 218 under the influence of the biasing force of the spring 212 on the enlarged head of the pin 210. This can stop the first roller 142 from rotating. Due to the self-locking principle of the engaging worm rod 121 and the gears 122, 124, 125, it can be sure that the first roller 142 can be restricted in a fixed position without any displacement. In this position, one of the images 152 on the projection film 150 can be projected on the front translucent screen 104 of the projection device 100.

When the motor 120 is started again, the first roller 142 rotates again and exerts a force on the enlarged head of the pin 210 which is held by one of the recesses 218. The enlarged head of the pin 210 will then be disengaged from the recess 218. The first roller 142 then rotates to the next position where the pin 210 engages with the next recess 218 and another image 152 can be projected on the front translucent screen 104 of the projection device 100.

While the projection device has been shown and described with particular references to a number of preferred embodiments thereof, it should be noted that various other changes or modifications may be made without departing from the scope of the appended claims.

What is claimed is:

1. A projection device for projecting images on a surface of the device, comprising:
    (a) an outer housing comprising a translucent screen;
    (b) a projection roller frame mounted inside the outer housing, wherein the projection roller frame comprises first and second spaced apart rollers rotatable respectively on two opposite ends integrally formed on a lampshade;
    (c) a projection film mounted between the first and second rollers;
    (d) a gear mechanism coupled with at least one of the first and second rollers;
    (e) a motor coupled with the gear mechanism;
    (f) a light source mounted inside the lampshade so that an image formed on the projection film can be projected on the translucent screen by the light source.

2. The projection device as claimed in claim 1, further comprising:
    (a) a projection module frame mounted on an inner surface of the outer housing;
    (b) wherein the projection roller frame is supported by the projection module frame; and
    (c) the projection film is curled up and held between the first and second rollers.

3. The projection device as claimed in claim 2, further comprising:
    (a) a cylindrical member formed at a center of a surface of the at least one of the first and second rollers facing the projection module frame;
    (b) a plurality of switch actuators formed around an outer circumference of the cylindrical member;
    (c) a switch provided on a switch box formed on a surface of the projection module frame facing the at least one of the first and second rollers, the switch being connected with an integrated circuit, and actuatable by the switch actuators;
    (d) a pin having an enlarged head, the pin being slidably received in a sleeve formed on the surface of the projection module frame;
    (e) a spring mounted around the pin for biasing the enlarged head of the pin against the surface of the at least one of the first and second rollers; and
    (f) a plurality of recesses formed on the surface of the at least one of the first and second rollers around the cylindrical member, the recesses being engageable with the enlarged head of the pin;
    (g) wherein when the motor is started, the at least one of the first and second rollers rotates via the gear mechanism until the switch is actuated by one of the switch actuators, and when the switch is actuated, the motor is switched off, and wherein the enlarged head of the pin is caught and held by one of the recesses, thereby holding the projection film in a position where the image is projectable on the translucent screen.

4. The projection device as claimed in claim 2, wherein the projection module frame comprises a first projection module frame member, and a second projection module frame member spaced apart from the first projection module frame member, wherein at least one of the first and second projection module frame members is in the form of an inner casing.

5. The projection device as claimed in claim 4, wherein one of the two opposite ends of the lampshade is coupled with the first projection module frame member, and another one of the two opposite cylindrical ends of the lampshade is coupled with the second projection module frame member.

6. The projection device as claimed in claim 4, wherein the motor and the gear mechanism are accommodated inside the inner casing.

7. The projection device as claimed in claim 6, wherein the gear mechanism comprises a worm rod mounted on a motor shaft of the motor; a first gear fixed on a gear shaft and engaged with the worm rod; a second gear fixed on the gear shaft and engaged with an external ring gear provided on an outer circumference of the first roller.

8. The projection device as claimed in claim 2, wherein the projection film has a first end held in a first groove formed on an inner surface of the first roller, and a second end held in a second groove formed on an inner surface of the second roller facing the inner surface of the first roller.

9. The projection device as claimed in claim 2, wherein the projection film is cylindrical in shape.

10. The projection device as claimed in claim 2, wherein the lampshade is sized and shaped to direct light from the light source towards the front translucent screen.

11. The projection device as claimed in claim 2, wherein the light source is an LED light source.

12. The projection device as claimed in claim 2, wherein the outer housing is in the shape of a cubic television set, and comprises a face panel provided at a side of the outer housing; and a pressing frame press-fitting the translucent screen on the face panel.

13. The projection device as claimed in claim 12, wherein a switching knob is provided on the face panel for activating the device or switching power on or off.

14. The projection device as claimed in claim 12, wherein a speaker is provided inside the outer housing.

15. The projection device as claimed in claim 14, wherein a volume control knob is provided on the face panel for adjusting volume of the speaker.

16. The projection device as claimed in claim 14, wherein the speaker is a Bluetooth® speaker and Bluetooth® technology is used for communication between the speaker and a mobile device so that the speaker can play music and sound from the mobile device.

17. The projection device as claimed in claim 2, wherein the projection film comprises four images.

18. The projection device as claimed in claim 2, wherein the image on the projection film is selected from the group consisting of transparent image, non-transparent image, cut-out hole and silhouette.

19. The projection device as claimed in claim 2, further comprising a battery held in a battery compartment which is formed on a rear panel of the outer housing to supply electricity to the projection device.

20. The projection device as claimed in claim 2, wherein the first and second rollers are disc-shaped rollers.

* * * * *